United States Patent
Mao et al.

(10) Patent No.: US 12,483,081 B2
(45) Date of Patent: Nov. 25, 2025

(54) DYNAMICALLY RECONFIGURABLE SYNCHRONOUS MOTORS AND GENERATORS

(71) Applicant: Quantentech Limited, Grand Cayman (KY)

(72) Inventors: Hengchun Mao, Allen, TX (US); Xuezhong Jia, Allen, TX (US)

(73) Assignee: Quantentech Limited, Grand Cayman (KY)

(*) Notice: Subject to any disclaimer, the term of this patent is extended or adjusted under 35 U.S.C. 154(b) by 260 days.

(21) Appl. No.: 18/153,555

(22) Filed: Jan. 12, 2023

(65) Prior Publication Data
US 2023/0231433 A1 Jul. 20, 2023

Related U.S. Application Data

(60) Provisional application No. 63/301,136, filed on Jan. 20, 2022.

(51) Int. Cl.
| | |
|---|---|
| *H02K 3/28* | (2006.01) |
| *H02K 11/33* | (2016.01) |
| *H02K 19/32* | (2006.01) |
| *H02P 25/22* | (2006.01) |

(52) U.S. Cl.
CPC .......... *H02K 3/28* (2013.01); *H02K 11/33* (2016.01); *H02P 25/22* (2013.01)

(58) Field of Classification Search
CPC ............ H02K 1/08; H02K 1/14; H02K 1/146; H02K 1/148; H02K 1/16; H02K 1/165; H02K 1/27; H02K 1/276; H02K 19/00; H02K 19/12; H02K 19/32; H02K 21/00; H02K 21/12; H02K 21/14; H02K 21/16; H02K 11/00; H02K 11/33; H02K 3/12; H02K 3/18; H02K 3/28; H02K 16/00; H02K 16/02; H02K 17/14; H02K 40/00; H02K 40/10; H02K 40/106; H02P 25/00; H02P 25/18; H02P 25/188; H02P 25/20; H02P 25/22; H02P 21/00; H02P 21/0089; H02P 21/06; H02P 21/10; H02P 21/22; H02P 27/12

See application file for complete search history.

(56) References Cited

U.S. PATENT DOCUMENTS

| | | | |
|---|---|---|---|
| 5,663,605 A * | 9/1997 | Evans | H02K 21/04 310/263 |
| 2020/0204099 A1* | 6/2020 | Mao | H02P 21/22 |

* cited by examiner

*Primary Examiner* — Tran N Nguyen
(74) *Attorney, Agent, or Firm* — AP3 Law Firm PLLC

(57) ABSTRACT

An apparatus has a plurality of poles facing an air gap, and the poles are configured to generate a magnetic field in the air gap. The poles include a group of unchanged poles and a group of reversible poles, where a polarity of each reversible pole is configured to be changed during an operation mode, and after the polarity has been changed, each reversible pole and at least an adjacent unchanged pole in effect merged into one augmented pole, such that the pole number of the magnetic field in the air gap is changed.

20 Claims, 16 Drawing Sheets

800

Group B

Group A

DYNAMICALLY RECONFIGURABLE SYNCHRONOUS MOTORS AND GENERATORS

PRIORITY

This application claims the benefit of U.S. Provisional Application No. 63/301,136, filed on Jan. 20, 2022, entitled "Dynamically Reconfigurable Synchronous Motors and Generators", which is hereby incorporated herein by reference.

TECHNICAL FIELD

The present disclosure relates to motors, generators, and electric drive systems, and in particular embodiments, to innovative technologies which improve the performance of motors/generators and electric drives through dynamically changing the pole and phase configuration of the motor/generator and its associated power electronics equipment.

BACKGROUND

High performance motor and generator systems are widely required for many industrial, automotive and consumer applications. There is a strong interest in achieving high performance and cost effective motor drive or generator systems. A general goal is usually higher power and torque density with high overall efficiency in motor/generator design. Polyphase machines, either as motors or generators, can generally achieve higher performance in various aspects than single-phase or 3-phase machines, including efficiency, power density, torque density, reliability and cost. With special arrangements in design and control of a polyphase motor, it is possible to adjust the number of poles and number of phases per pair of poles dynamically with dynamic reconfiguration technology during operation, in order to further improve the performance and reduce the cost of the system. Special control architecture such as multi-harmonic field-oriented control (FoC) may be utilized to implement control in such dynamically reconfiguration drive systems. However, so far the dynamic reconfiguration technology has been realized mainly with induction motors, and there are still more challenges to be overcome for implementation in synchronous machines.

This disclosure presents innovative techniques to realize dynamical reconfiguration in various synchronous motors, such as wound synchronous motors, permanent magnet motors, or hybrid excitation motors. Although the description will be based on motors, the techniques can be applied to their generator counterparts or regenerative mode operation of a motor. The main focus will be on addressing the power/torque density and efficiency of the motor/generator and drive systems, especially for applications requiring high performance over a very wide speed range.

SUMMARY

These and other problems are generally solved or circumvented, and technical advantages are generally achieved, by preferred embodiments of the present disclosure which provide a high performance implementation of a motor drive system through dynamic configuration of poles and/or phases of the motor and generator.

In accordance with an embodiment, a device has a rotor magnetically coupled to a stator through an air gap and a plurality of phase windings configured to be coupled to a plurality of inverters and generate a first magnetic field. A pole number of the first magnetic field is configured to be dynamically adjustable through controlling currents in the plurality of phase windings by configuring the plurality of inverters. The device also has a plurality of poles comprising a group of unchanged poles and a group of reversible poles, and the plurality of poles is configured to generate a second magnetic field in the air gap. Polarities of the unchanged poles are fixed in operation, and a polarity of each reversible pole is configured to be changed during an operation mode, and after the polarity has been changed, each reversible pole and at least an adjacent unchanged pole are in effect merged into one augmented pole, and the pole number of the second magnetic field is changed.

In accordance with another embodiment, a system comprises a motor having a plurality of phase windings, a rotor, an air gap, and a stator magnetically coupled to the rotor through the air gap. The phase windings are configured to generate a first magnetic field in the air gap, and a pole number of the first magnetic field is configured to be dynamically adjustable through controlling currents in the plurality of phase windings. The motor also has a plurality of poles facing the air gap and configured to generate a second magnetic field in the air gap, and the plurality of poles includes a group of unchanged poles and a group of reversible poles. Each unchanged pole has a fixed polarity, and each reversible pole has a field winding around a pole body, where a polarity of each reversible pole is configured to be changed during an operation mode, and after the polarity has been changed, each reversible pole and at least an adjacent unchanged pole in effect are merged into one augmented pole, and the pole number of the second magnetic field is changed. The system further has a plurality of power inverters coupled to the plurality of phase windings, and the plurality of power inverters is configured to control currents of the plurality of phase windings such that the pole number of the first magnetic field is dynamically adjusted during the operation mode. The system has a field current regulator coupled to the group of reversible poles and configured to change direction of currents of the field windings in the operation mode such that polarities of the group of reversible poles are changed in synchronization with the pole number adjustment of the first magnetic field.

In accordance with yet another embodiment, an apparatus has a plurality of poles facing an air gap, and the poles are configured to generate a magnetic field in the air gap. The poles include a group of unchanged poles and a group of reversible poles, where a polarity of each reversible pole is configured to be changed during an operation mode, and after the polarity has been changed, each reversible pole and at least an adjacent unchanged pole in effect merged into one augmented pole, such that the pole number of the magnetic field is changed.

An advantage of an embodiment of the present disclosure is using pole change to improve the operation performance of a synchronous motor drive system.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

Figure 1:
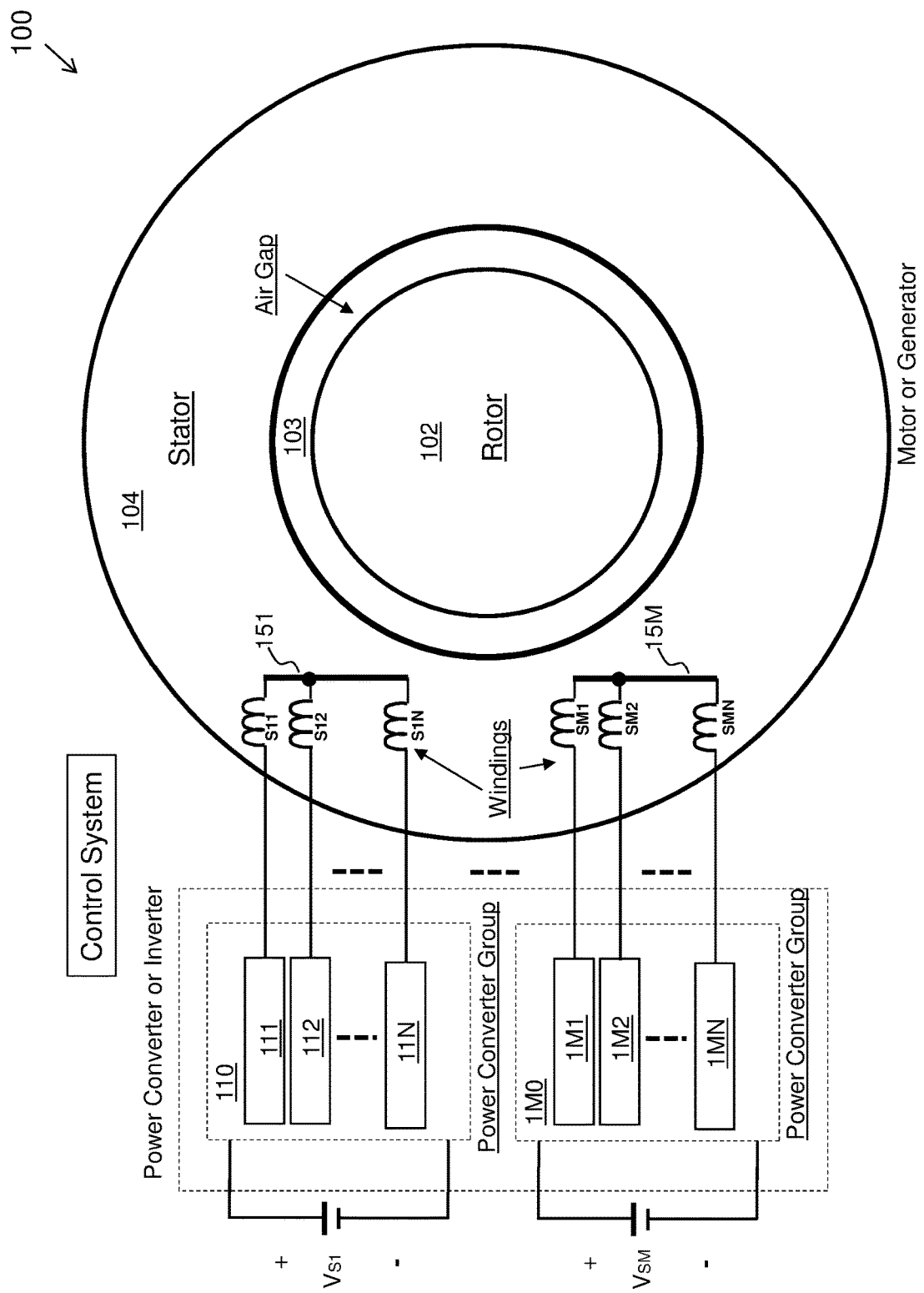
FIG. 1 illustrates a block diagram of a reconfigurable motor/generator system in accordance with various embodiments of the present disclosure.

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

The present disclosure will be described with respect to preferred embodiments in a specific context, namely a high-performance motor or motor drive system. The motor drive system may be applied to a variety of electric or hybrid vehicles, robots, drones, appliances, wind power, industrial drives, and/or other applications. Throughout the description, dynamically reconfigurable wound field synchronous motors are used as an example, but the technology discussed generally can be applied to other machines such as permanent magnet motors, hybrid excited motors, and various generator counterparts. Hereinafter, various embodiments will be explained in detail with reference to the accompanying drawings.

In a motor there is always an inherent conflict between low speed high torque performance and high speed high power operation. It has been long desired to improve the performance and cost of a motor and motor drive system by dynamically changing the number of poles (or simply called pole number) of the motor during operation for demanding applications. It has been known that specially designed multi-phase motors may be dynamically reconfigured to operate with different number of poles and different number of phases within a pair of poles through adjusting the phase shift between phase currents. In dynamically reconfigurable motors, the pole number is the number of positive/negative halves of the magnetic field waveform, usually in the air gap—see FIGS. 6 through 8 for examples. Please note that due to a rotating feature of the magnetic field in a motor, the magnetic waveform may be observed as a spatial waveform obtained as a snapshot at a time point, or as a time-variant waveform of magnetic field strength at a given spot. The waveform of a magnetic field may also be obtained indirectly from a voltage of a winding, for instance the voltage, especially the open-circuit voltage of a phase winding, can often reflects the waveform of a magnetic field in the air gap. As an example, the waveform of the magnetic field in the air gap by the poles of a synchronous motor can be obtained from the open-circuit voltage waveform of a phase winding (or a similar sense winding). Dynamic reconfiguration of multi-phase motors can be implemented straightforwardly in a squirrel-cage induction motor, as the currents in the squirrel cage structure can easily follow the magnetic field in the air gap, so the magnetic field generated by the rotor currents and the magnetic field generated by the stator currents have the same pole number naturally in an induction motor. To implement it in a synchronous motor requires more delicate work, which is the focus of this disclosure. Although in this disclosure the phase windings (sometimes simply referred to as windings) are shown in a stator, it is mere an example to show various aspects of the invention. In a design the roles of a rotor and a stator may be exchanged, and a rotor may be inside, outside or at the side of a stator.

A motor may have a plurality of stators and a plurality of stators, separated mechanically by a plurality of air gaps. FIG. 1 shows as an example a topology of a dynamically reconfigurable motor system (DR Motor). It is an exemplary poly-phase drive system with a poly-phase motor having a rotor, a stator and an air gap, coupled to a poly-phase inverter, which can be used to control the dynamically reconfigurable system. The motor has multiple windings arranged into a plurality of groups, each winding coupled to the an output of the inverter. The windings may be distributed windings or concentrated windings on the stator or the rotor, with a full pitch or a short pitch, and we will use windings on the stator as an example below. The rotor may be outside the stator as in an outer rotor machine, or besides the stator as in an axial flux machine. The inverter may comprise a plurality of groups, and each group may have multiple inverter legs coupled to a power source. The power sources of the inverter may be isolated from each other, or may be connected in series or in parallel.

In FIG. 1, the reconfigurable motor system 100 comprises a stator 104, a rotor 102 and an air gap 103. The rotor 102 may have a squirrel cage construction or a different construction. The stator 104 comprises a plurality of stator windings. The plurality of stator windings may be embedded in the stator core. More particularly, the stator core may comprise a plurality of slots. Each slot is employed to accommodate one stator winding. Alternatively, depending on different applications and design needs, each slot may be employed to accommodate multiple stator windings. In addition, the reconfigurable motor system may not include a stator core (e.g., a coreless motor), or there is no slot in the stator core.

As shown in FIG. 1, the plurality of stator windings may be divided into M groups, where M is a predetermined integer. The stator windings of each group are connected by a connection ring or a connection bar. For example, the stator windings S11-S1N of the first group are connected by a first connection ring 151 as shown in FIG. 1. Likewise, the stator windings SM1-SMN of the mth group are connected by an mth connection ring 15M as shown in FIG. 1. In FIG. 1, the connection rings are shown floating (e.g., the connection rings are isolated from each other as shown in FIG. 1). In this disclosure, a connection ring may not be an enclosed shape, and thus can be a connection bar. If some of the M input power sources are isolated from each other, some of the connection rings 151-15M may be electrically connected together, or form a single connection ring.

Furthermore, the reconfigurable motor system 100 comprises a plurality of power converter groups. Each power converter group is connected between a power source and a corresponding stator winding group. As shown in FIG. 1, a first power converter group 101 is connected between a first power source VS1 and the first group of the stator windings S11-S1N. The first power converter group 110 comprises a plurality of power converters 111-11N as shown in FIG. 1. Likewise, an Mth power converter group 1Mo is connected between an mth power source VSM and the mth group of the stator windings SM1-SMN. The Mth power converter group 1Mo comprises a plurality of power converters 1M1-1MN as shown in FIG. 1. In some embodiments, the plurality of power converters is divided into a plurality of power converter groups sequentially.

In some embodiments, the power sources VS1-VSM are separate power sources as shown in FIG. 1. In alternative embodiments, the power sources VS1-VSM may be connected in series to accommodate a high input voltage applied to the reconfigurable motor system 100. Furthermore, the power sources VS1-VSM may be developed from capacitors connected in series and coupled to a common power source. Thus, it may be important to achieve a charge balance among the power sources. In order to accomplish a charge balance of the power sources connected in series, it is desirable that the dc currents flowing in/out of the power sources are equal or approximately equal (e.g., within 20% tolerance) to each other.

In some embodiments, the power sources can perform efficiently and reliably when the current flowing through each power source is a dc current or a current having low low-frequency components. For example, the harmonic components (e.g., the fundamental and the low order harmonics) of the current should be reduced down to the minimum. In some embodiments, each winding group should have at least three stator windings evenly spaced in a pair of poles. The stator windings are configured to conduct currents with the same amplitude and frequency. Furthermore, the phase angles of the currents are evenly distributed among the stator windings. As a result, the stator windings in each winding group form a symmetrical and balanced multi-phase system, and the current flowing through each power source is a dc current in ideal operation.

In operation, each phase winding is controlled to conduct a desired current. A desirable magnetic field can be established in the air gap 103 between the stator 104 and the rotor 102 by controlling the currents in the phase windings (phase currents), or more accurately by controlling the magnetizing components of the phase currents. The phase windings may be divided into several groups, each group may be coupled to a power source through a plurality of power inverters, where multiple power inverters may form and be controlled as a multi-phase inverter if desired. A phase winding may be a conductor in a slot, or may be formed as concentrated or distributed windings with various structures. The multiple windings may be put in series or in parallel if desired. The inverter can be controlled with a field-oriented control having harmonic currents at a plurality of harmonic frequencies.

In some embodiments, reconfigurable motor system 100 has N phase windings in the stator arranged into P pairs of poles in a symmetrical fashion. The number of phases M is equal to N divided by P (N/P). The fundamental phase displacement angle (phase shift) can be expressed as:

$$\theta1=(360°·P)/N \quad (1)$$

In comparison with a traditional structure in which the windings within each pair of poles are fixed by the predetermined construction and design, in the dynamically reconfigurable structure such as the one shown in FIG. 1, the number of phases M may be an integer or not an integer. For example, a motor may have 16 phase windings which may be placed into six poles. As a result, each pair of poles has 5.33 phases (16/3). This is a split-phase construction. In other words, a pair of poles sometimes has five phases, and sometimes has six phases.

One advantageous feature of having the split-slot pole construction is the asymmetry between different pairs of poles exists at any particular time, and this kind of asymmetry may be used advantageously to create an additional torque similar to the effect of the reluctance variation. The availability of split-phase configurations in a DR Motor gives more flexibility to improve the design of the DR Motor.

$Ii1=I1·sin(2\pi f - i·\theta1)$ The system may be controlled via multiple harmonic planes, and each harmonic plane corresponds to harmonic currents/voltages/flux at different harmonic frequencies. At a time, there may be one or more harmonic components in the currents and voltages in the phase windings. Using currents as an example, in some embodiments, the fundamental frequency component of ith phase winding current satisfies the following equation:

$$Ii1 = I1 \cdot \sin(2\pi f - i \cdot \theta 1) \quad (2)$$

where θ1 is the phase displacement angle for the fundamental frequency component.

In some embodiments, the jth harmonic component can be expressed as:

$$Iij = Ij \cdot \sin(j \cdot (2\pi f - i \cdot \theta 1)) \quad (3)$$

Equation (3) can be simplified as:

$$Iij = Ij \cdot \sin(2\pi j \cdot f - i \cdot j \cdot \theta 1) \quad (4)$$

As indicated by Equation (4), the phase displacement angle for the jth harmonic component is:

$$\theta j = j \cdot \theta 1 \quad (5)$$

In some embodiments, if the jth harmonic can satisfy the following equation, the jth harmonic applied to the motor forms a balanced system having the number of pole pairs equal to j times P.

$$N/(j \times P) > 3 \quad (6)$$

The synchronous speed for the jth harmonic can be expressed as:

$$S_j = 60 \cdot j \cdot \frac{f}{j \cdot P} = 60 \cdot f/P \quad (7)$$

As indicated by Equation (7), the synchronous speed $S_j$ for the jth harmonic is the same as the synchronous speed of the fundamental component in a DR Motor system.

When currents flow in the windings, the magnetic field they generate along the air gap have a repetitive pattern in waveform. Particularly, along the perimeter of the air gap, the magnetic field waveform may be divided into a plurality of sections, each section having a positive half wave, and a negative half wave. A section can be viewed as a pair of magnetic poles, so the number of sections correspond to the number of pole pairs, which is the number of positive and negative half waves in the complete waveform along an entire perimeter of the air gap. In a dynamically reconfigurable motor (DR motor), through changing the phase shift between currents in neighboring windings, the number of poles can be adjusted fast and smoothly during operation and the motor should work effectively in all pole configurations it is designed to operate with. For example, if the winding system in the motor is constructed with P poles, with harmonic control the motor may operate with 2P poles, 3P poles, etc. Please note that each winding may be full-pitch or short pitch, but attention should be made to use a pitch with results in acceptable performance to generate high torque in all intended pole configurations.

Mathematically, a DR motor can be modelled and controlled in multiple synchronous dq planes (called harmonic planes). The number of poles in a harmonic plane is proportional to the order of the harmonic, and thus the synchronous speed of all harmonic planes is equal. These harmonic planes can be controlled to rotate in the same direction as independent synchronous planes. A DR motor can be designed to generate torque and transfer power efficiently on all or some of these synchronous planes. Generally, each harmonic plane can be treated independently from each other, and potentially transfer energy and generate mechanical torque independently, but not all independent harmonic planes are used for such purpose at any given time. For example, in a 9-phase or 9-winding motor, 1$^{st}$(fundamental), 3$^{rd}$, 5$^{th}$, and 7$^{th}$ harmonic planes may be independently controlled, but the choice of harmonic sets may not be unique. For example, 1$^{st}$(fundamental), 2$^{nd}$, 3$^{rd}$, and 5$^{th}$ harmonic planes may be also independently controlled. Some or all these harmonic planes can be used to generate power and torque in some operation modes, or be controlled to get better waveform quality of the currents in other operation modes(for example setting 2$^{nd}$, 3$^{rd}$, and 5$^{th}$ harmonic current references to zero) to reduce power losses in the inverters and the windings and the core of the motor as harmonic currents usually cause additional power losses. For example, in a DR motor, fundamental frequency currents, third-harmonic frequency currents, and/or fifth-harmonic currents, can be controlled to generate a rotating magnetic field in the same direction and at the same speed, and thus transfer energy and generate torque simultaneously, in steady-state operation or during a transition from an operation mode with one pole configuration to a different operation mode another pole configuration. At any given time, one or more harmonic planes can be chosen to transfer power and/or generate torque. The current references in other independent harmonic planes (inactive harmonic planes) can be set to zero to reduce the harmonic power losses in the motor and inverter, or the inactive planes can be left uncontrolled. When the phase shift between the currents in the phase windings) may be changed, different number of poles and number of phases can be obtained. The field-oriented harmonic injection technique can be examined and applied for each pole or phase configuration in such a system.

Figure 2:
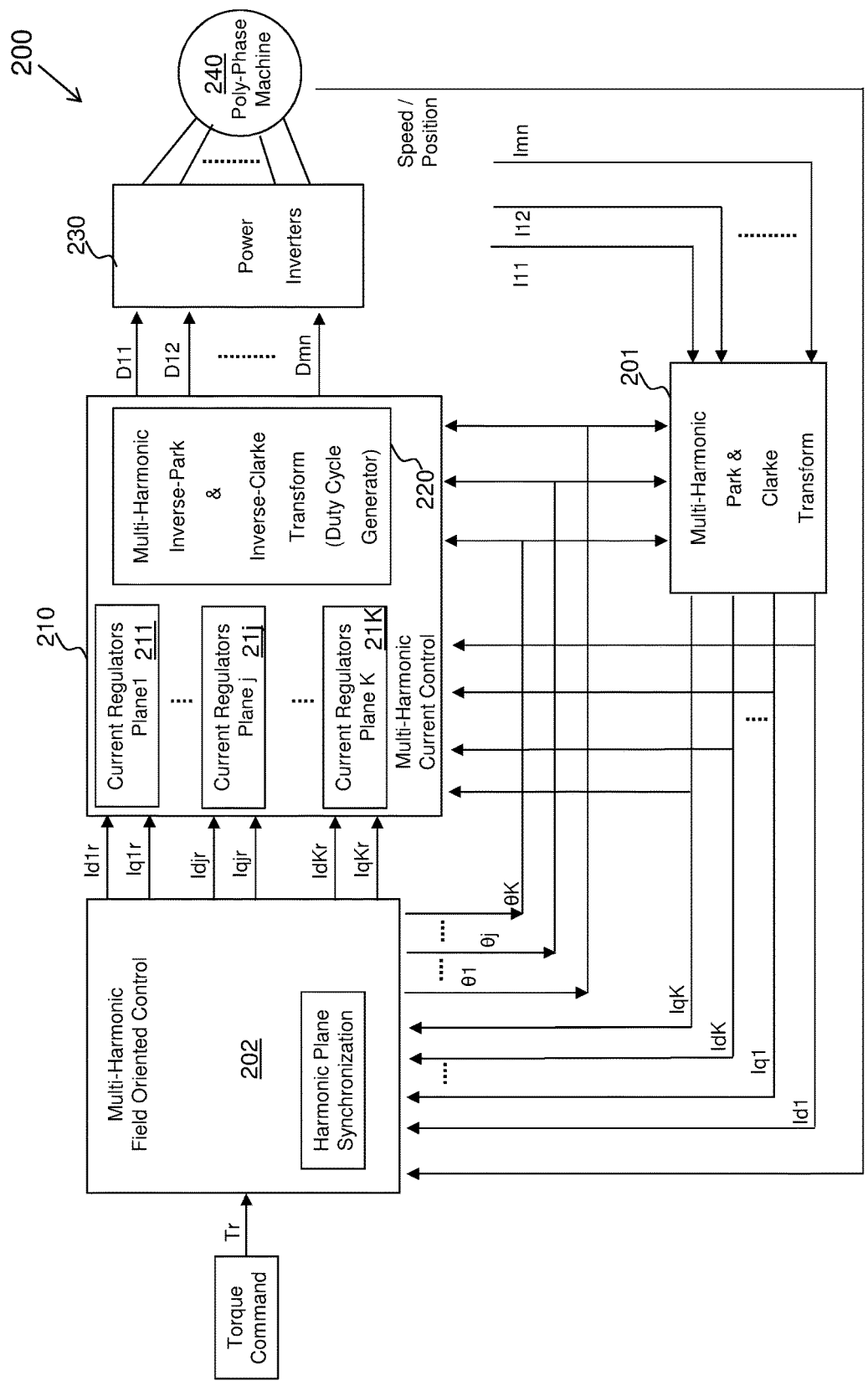
FIG. 2 illustrates an example of multi-harmonic FoC control system in accordance with various embodiments of the present disclosure.

To fully utilize the potential for such a system, it is advantageous to implement coordinated FOC at multiple harmonics. FIG. 2 illustrates an example of control system block diagram for the DR Motor system shown in FIG. 1 using multiple harmonic planes. The torque reference input Tr represents system output, which could also be a power or other parameter depending on system control objective at the time. It may be from a torque command, or from an output of a speed regulator or position regulator in the control system. A change in Tr causes the current references to change. In FIG. 2, sensed phase currents (i.e. currents in the windings of motor 240) I11 to Imn of a poly-phase motor 240 may be converted to synchronous variables Id1, Iq1 through IdK and IqK, where K is the number of independent harmonic planes through multi-harmonic Park and Clarke transformation. Generally, the d-axis components correspond to magnetizing components, and the q-axis components correspond to torque components, at various harmonic planes. The multi-harmonic Park and Clarke transformation block 201 are coordinate transfer mechanism to change the phase currents, which have various harmonic contents, to values in dq frames on the various harmonic planes, and such synchronous variables are dc values in steady state operations. The transformation matrix used in block 201 contains trigonometric functions at each interested harmonic frequency. Please note that assuming a balanced polyphase system, harmonic components at certain frequency in the phase currents will be transformed into dc values in dq frame on the corresponding harmonic plane with the same harmonic order, and zero in dq frames in other harmonic planes. That is, the multi-harmonic transformation is a filter which removes other harmonic components but changes the right harmonic components of currents or voltages at the interested frequency to dc values in the dq frame on the harmonic plane with the same order. For example, in a balanced 9-phase system, there is 4 independent harmonic planes, and we can select the first-order (fundamental), second-order, third-order and fifth-order harmonic planes as the active planes. Through multi-harmonic coordinate transformation, in steady-state operations the fundamental component of the phase currents will be represented by a constant d-axis component and a constant q-axis component in the fundamental harmonic plane, but their contribution to the $2^{nd}$-order, $3^{rd}$-order and $5^{th}$-order harmonic plains will be zero. Similarly, the $3^{rd}$-order harmonic components in the phase currents will be represented by a constant d-axis component and a constant q-axis component in the 3rd-order harmonic plane, but their contribution to the fundamental, $2^{nd}$-order, and $5^{th}$-order harmonic planes will be zero. In such a system, the current components on each independent harmonic plane can be controlled independently from currents on the other harmonic planes.

A multi-harmonic FoC block 202 looks at Tr and generates dq-frame current references Idir through Iqir, where i is an index in the range of 1 through K, according to field oriented control principles with synchronization among different harmonic planes. The synchronization coordinates the power transfer at different harmonic plane, may be used to optimize the performance of the system, such as increasing power or torque output while alleviating magnetic saturation at different regions of the motor. Based on the current references in the dq-frames in different harmonic planes, a multi-harmonic current control block 210 regulates the winding currents of motor 230 through a plurality of current regulators 221 through 22K for harmonic planes 1 through K. In current control block 210 there is also a multi-harmonic inverse-Park and Inverse-Clarke transformation functions 220, and duty cycle signals D11 through Dmn for power switches in the power inverters 230 are generated. The outputs of power inverter 230 are coupled to the windings of the poly-phase motor 240, and thus control the winding currents of motor 240 and generate the required system output.

To generate torque at a harmonic plane which corresponding to winding currents at certain frequency, magnetic field generated by the rotor of the motor along the air gap must have the same harmonic signatures, i.e. the rotor magnetic field must have the same number of poles in space, and must travels at the same speed and in the same direction as the stator magnetic field generated by the winding currents. If the stator of a motor is controlled according to the above dynamic reconfiguration principle, the rotor needs to have also a pole-changeable structure, and the change of poles on the rotor can be synchronized with winding current changes in the stator, no matter how the rotor generates its magnetic field. This disclosure focuses on the pole reconfiguration in motors with wound-field magnets, especially in synchronous motors. Please note that such pole reconfiguration can be applied to both rotors and stators, although the following discussion will mostly use magnets in a rotor as an example.

Figure 3:
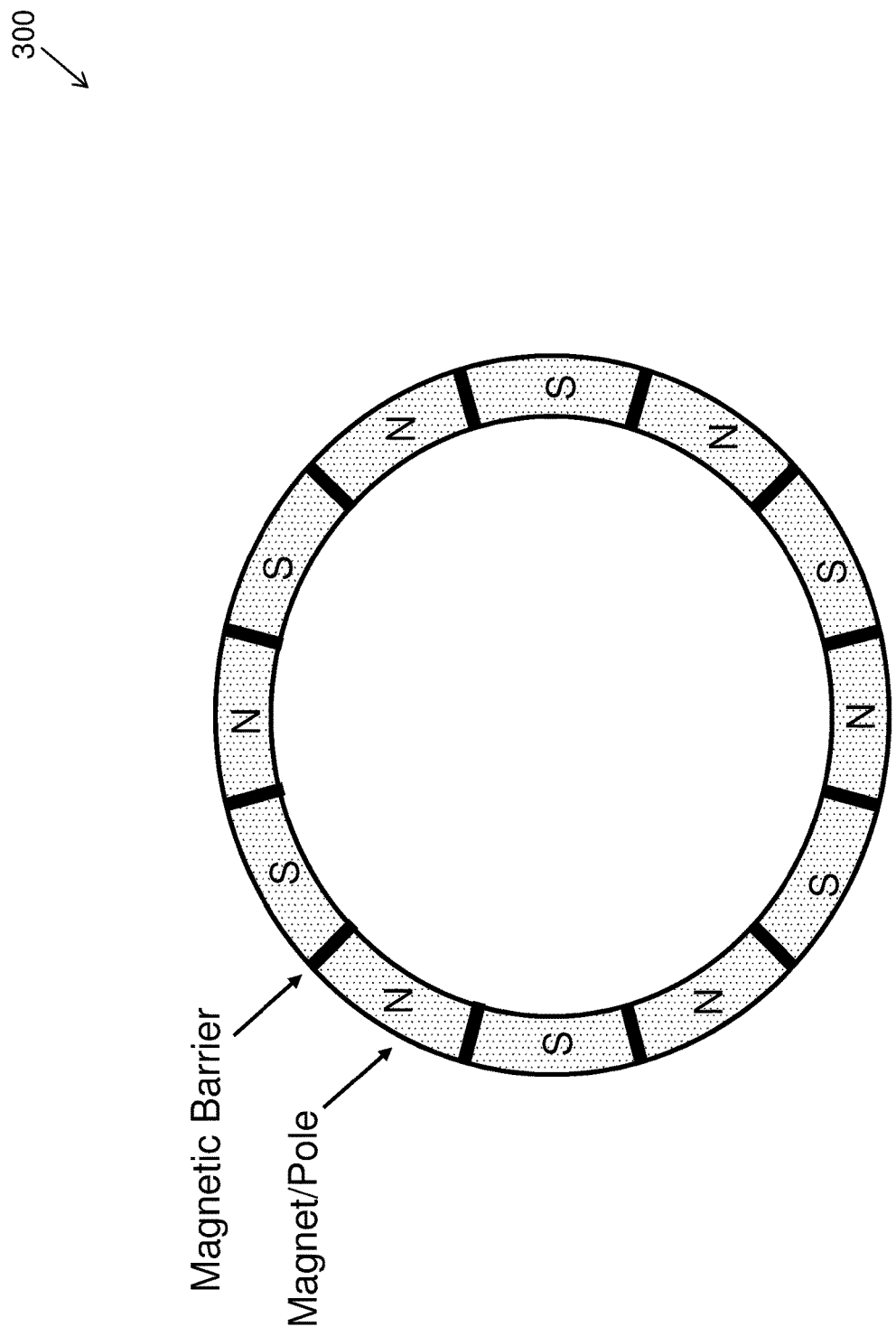
FIG. 3 shows an arrangement of 12 poles in a motor/generator in accordance with various embodiments of the present disclosure.
Figure 4:
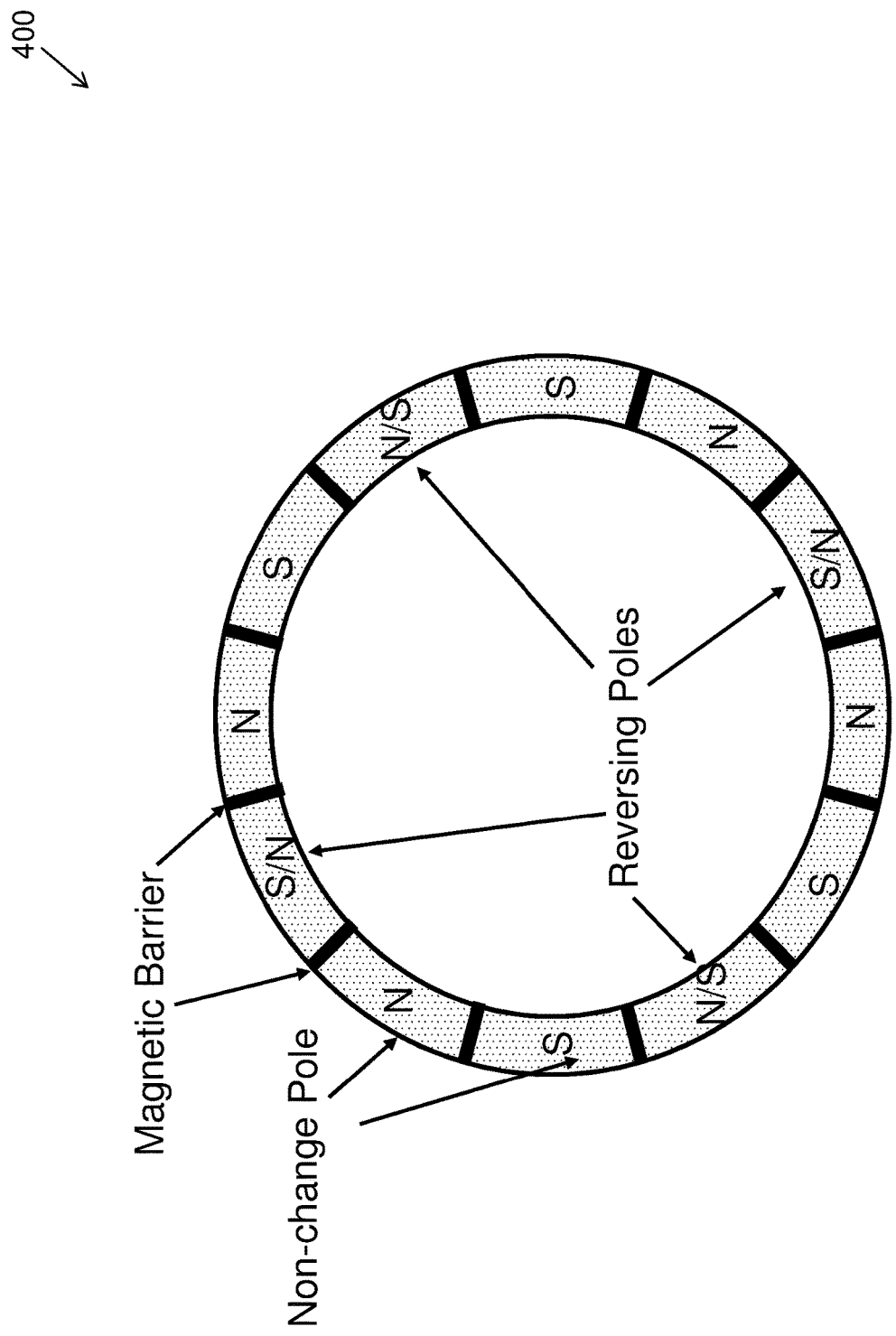
FIG. 4 illustrates 4-pole configuration of the 12-pole arrangement shown in FIG. 3 in accordance with various embodiments of the present application.
Figure 5:
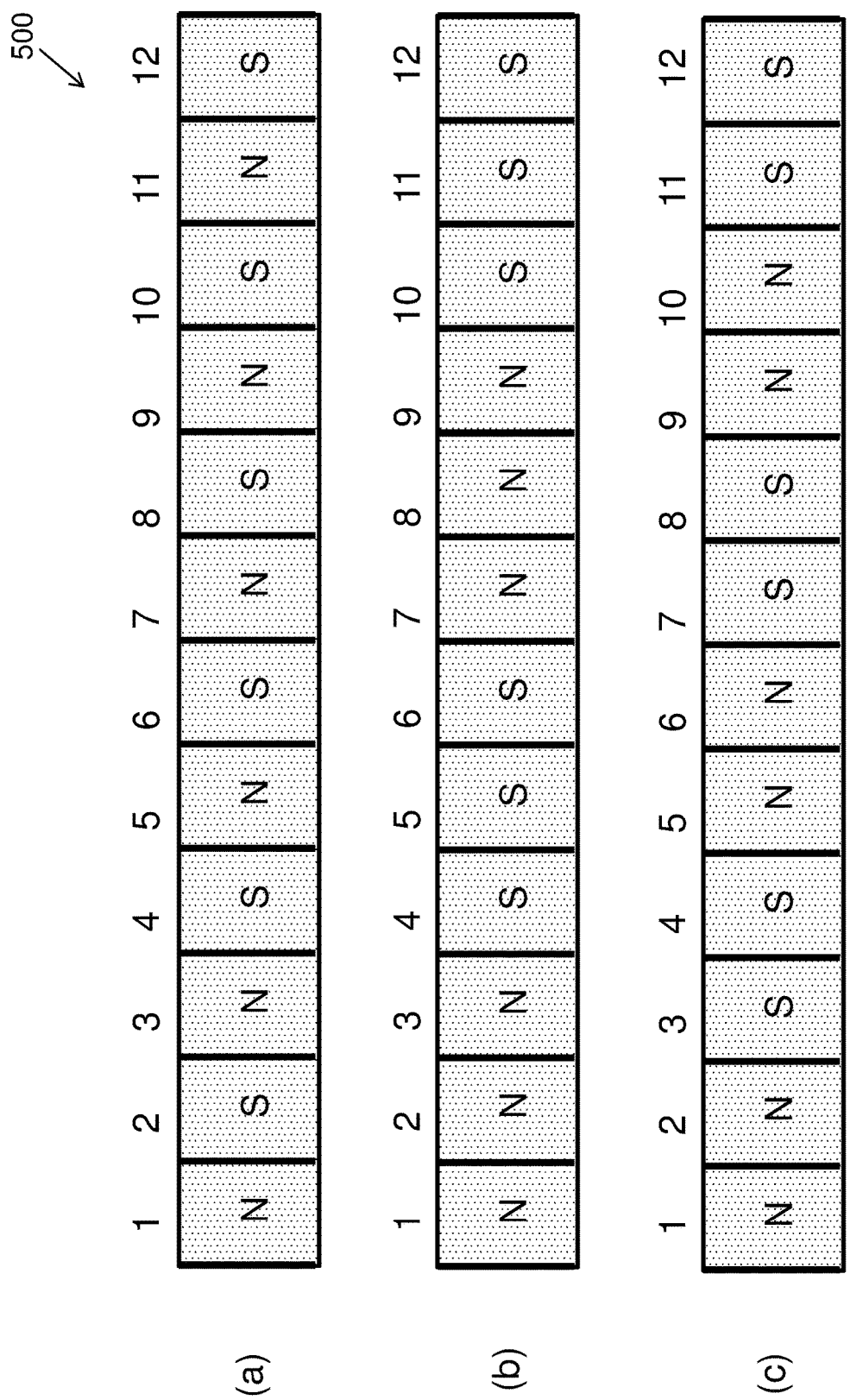
FIG. 5 illustrates different configurations of the 12-pole arrangement shown in FIG. 3 in accordance with various embodiments of the present disclosure.

In a synchronous motor, the rotor has a plurality of magnetic poles in S and N polarity. Polarity of a magnetic pole is determined by the value of magnetic flux density it produces in the adjacent area of the air gap. In this disclosure, when the magnetic flux density (indicated by symbol B) is positive, the polarity is called N (north), and when the magnetic flux density is negative, the polarity is called S (south). FIG. 3 shows a conceptual illustration of a 12-pole rotor, and the 12 magnetic poles (also called magnets, or simply as pole) are labeled N or S according to its magnetic polarity. Between poles there are magnetic barriers, which prevents or reduces magnetic field leaking between adjacent poles. Although the poles are shown to cover the outer perimeter of rotor, other shape of poles and arrangements are also possible, and are known in the industry. The inventive aspects of this disclosure doesn't depend on any detail of the pole construction. FIG. 4 shows another conceptual illustration of the same rotor with 4 of the poles reversing polarity, which can be realized by just reversing the current direction in the field windings of these poles, if they are implemented as wound-field poles. The polarity reversed poles are marked by previous polarity/new polarity, such as S/N or N/S. Basically, now the poles are configured to form 4 groups, in each group the poles have the same polarity so they become a single augmented pole in effect. So, after changing the polarity of those 4 poles, the rotor in effect becomes now a 4-pole structure. That is, by adjusting the magnetic field of a group of poles, the general magnetic pattern is changed, and the number of poles of the rotor now can be adjusted dynamically. So FIG. 3 shows a high-pole configuration with a high number of poles and FIG. 4 shows a low-pole configuration with a low number of poles for the same rotor (or motor). FIG. 5 shows the change of pole configuration more clearly, where the numbering of poles is consecutive along the perimeter of the air gap. FIG. 5(a) shows a 12-pole configuration (high-pole configuration). If poles 2, 5, 8, and 11 changes polarity, then the rotor has a 4-pole configuration (low-pole configuration), which is shown in FIG. 5(b). There is other possibility also. From the 12-pole configuration shown in FIG. 5(a), a 6-pole configuration (mid-pole configuration) can be realized by changing the polarity of poles 2, 3, 6, 7, 10, and 11, as is shown in FIG. 5(c). FIG. 5(a), FIG. 5(b) and FIG. 5(c) are also collectively referenced as FIG. 5 in this disclosure. FIGS. 3, 4 and 5 show that just changing the polarity of a group of poles, different pole configurations can be achieved. Also, the amplitude of magnetic field strength of poles may be adjusted to have more elaborate control of the magnetic field distribution (which indicates also harmonic contents in the magnetic field waveform), shaping the magnetic field in the air gap for better performance of the motor. In a motor the magnetic field in the in the air gap is most critical in power and torque generation, and the total magnetic field in the air gap includes a component generated by currents and magnets in the rotor and a component generated by currents and magnets in the stator. The magnetic field (or component) generated by the rotor and the magnetic field (or component) generated by the stator interact in the air gap to convert energy and produce torque and power in a motor. To produce a consistent torque/power output, these two magnetic fields (or field components) need to have the same number of poles and the same rotation speed. This disclosure focuses more on shaping the air gap magnetic field generated by the rotor, including adjust its pole number and/or harmonic contents, to improve the motor and drive system performances. However, it should be noted that the roles of stator and rotor can be exchanged, so all techniques and constructions applied to one can be applied to the other. Also, there may be more than one rotors or stators in a motor.

Different numbers of poles can be utilized for different designs, and a design can have a set of realizable pole numbers to fit the application. In this disclosure we will use a 12 to 4 pole change corresponding to FIGS. 5(a) through 5(c) as examples to illustrate pole reconfiguration concept.

Figure 6:
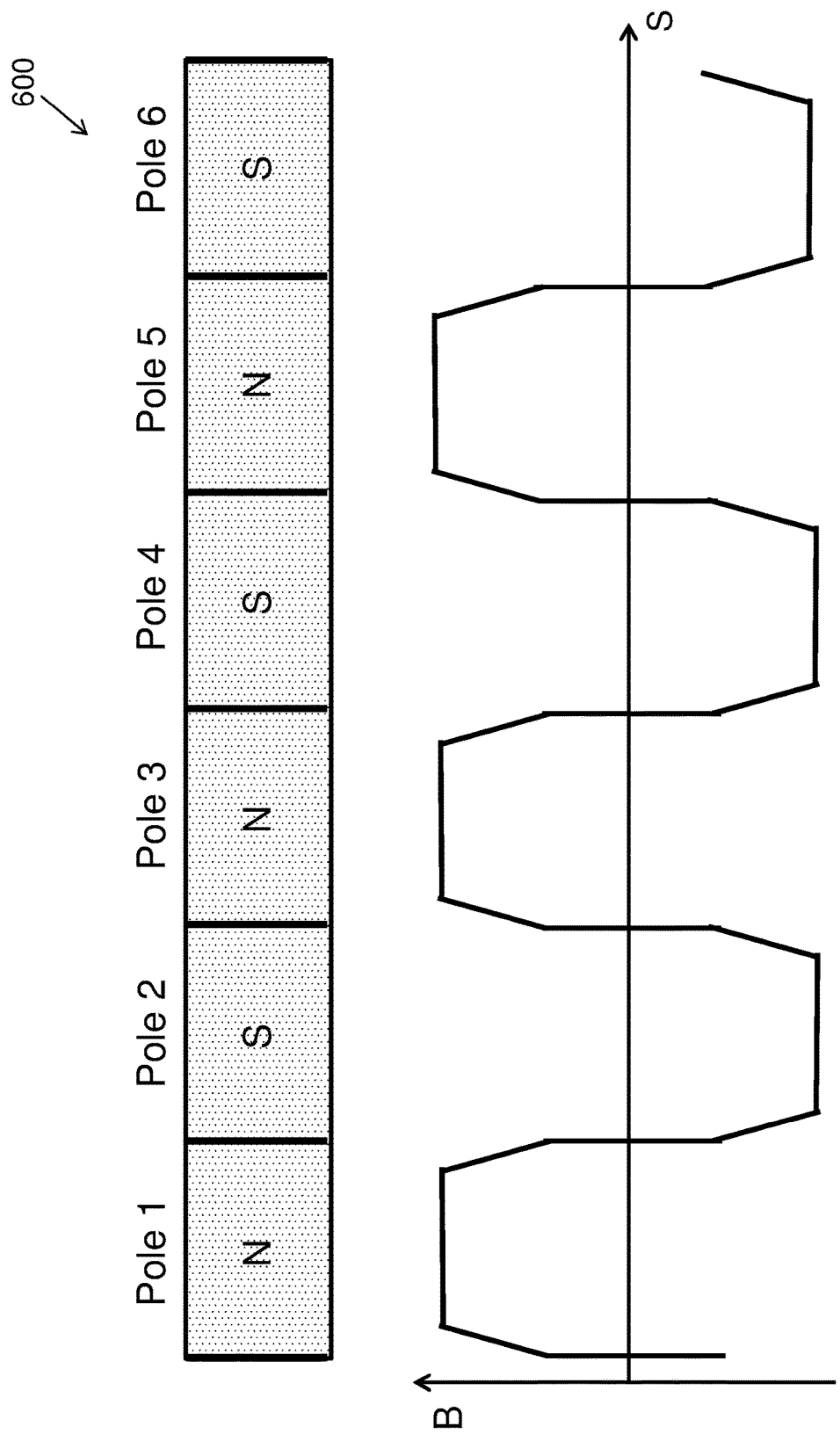
FIG. 6 shown an exemplary magnetic field waveform in a high-pole configuration in accordance with various embodiments of the present disclosure.
Figure 7A:
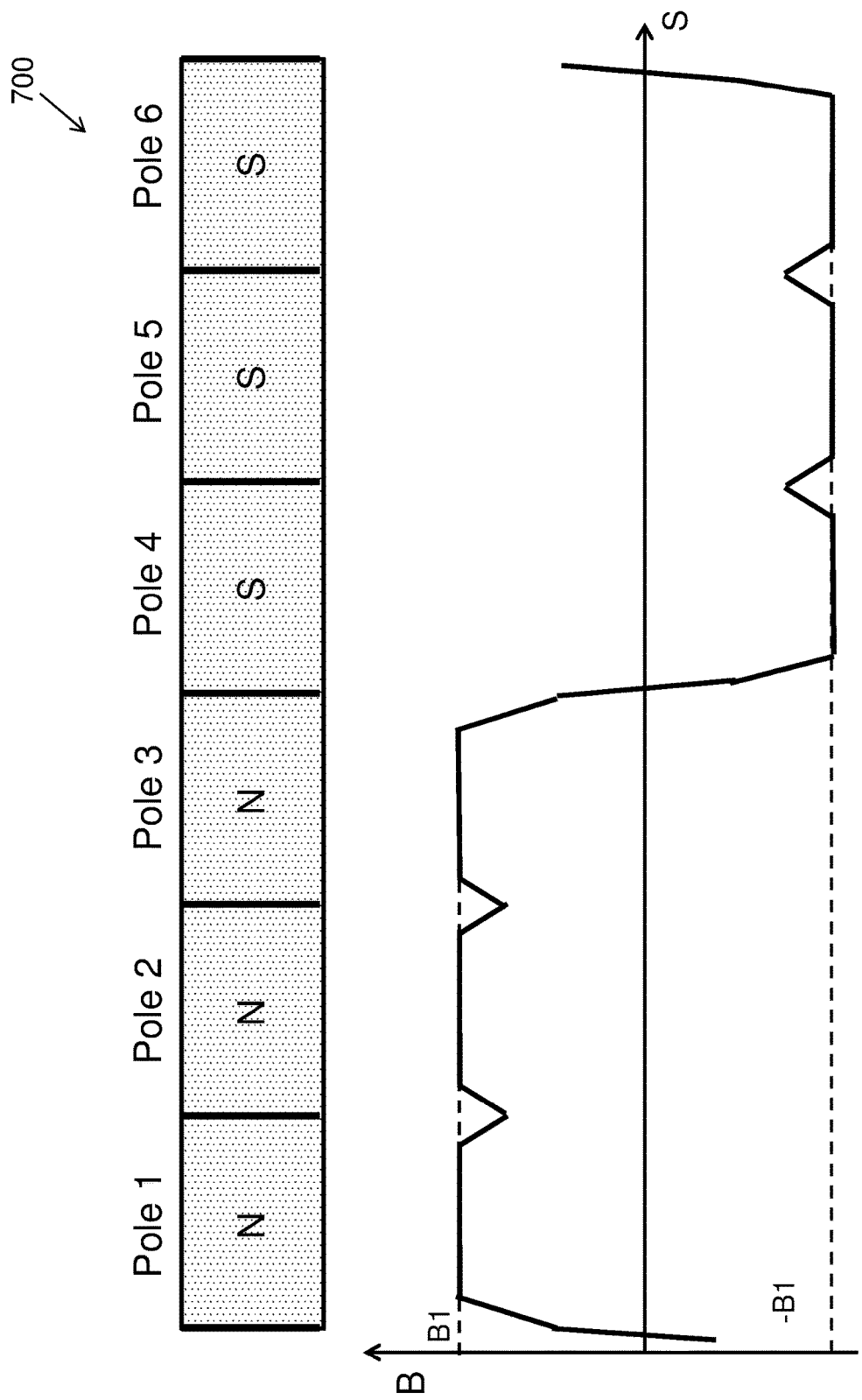
FIG. 7A shows an exemplary magnetic field waveform in a low-pole configuration in accordance with various embodiments of the present disclosure.
Figure 7B:
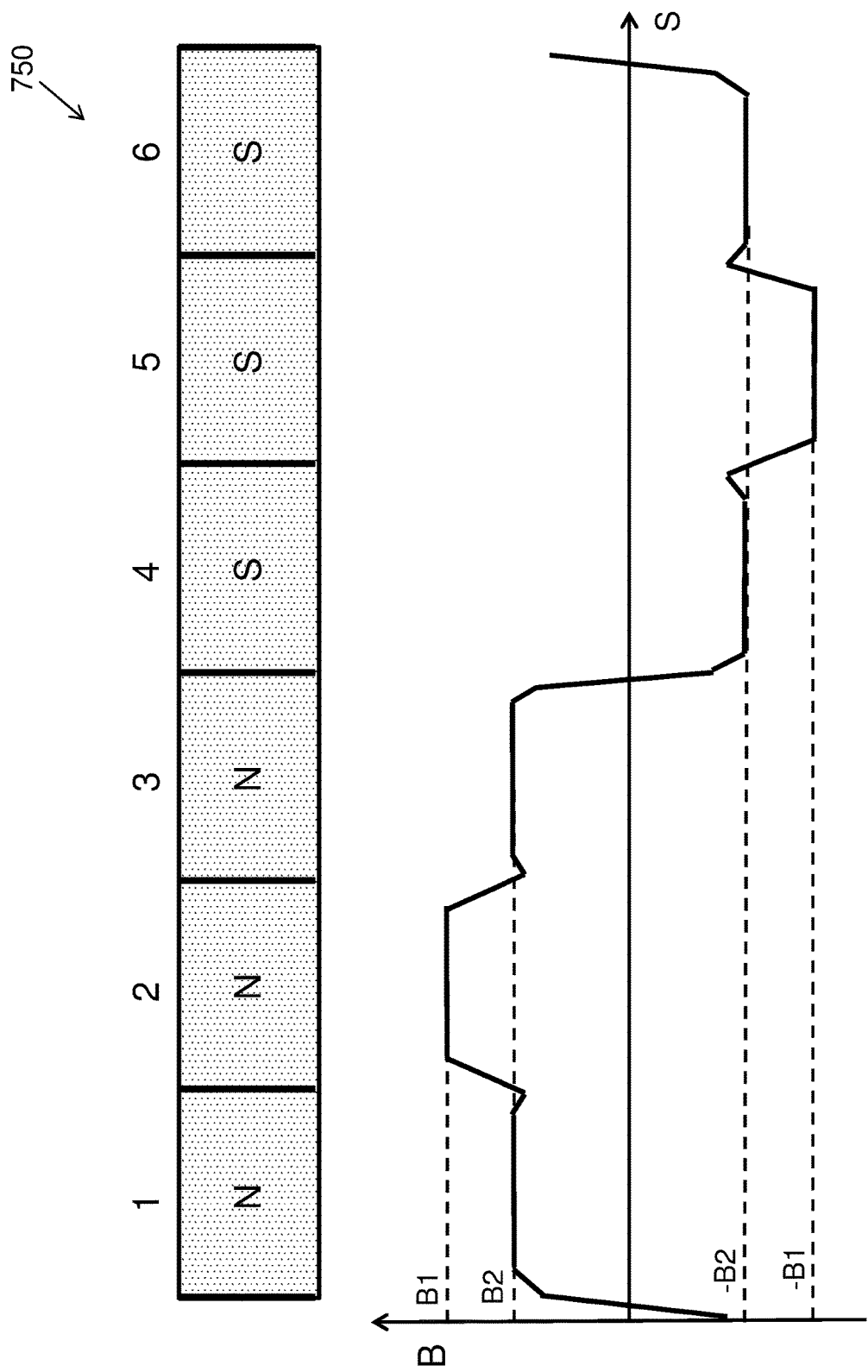
FIG. 7B shows another exemplary magnetic field waveform in a low-pole configuration in accordance with various embodiments of the present disclosure.

As is known in the industry, the magnetic field generated by the rotor may have different shapes along the air gap (also called spatial magnetic distribution or simply magnetic distribution, which in shape is the same as the waveform of magnetic field strength seen at a spot in a magnetic path of the motor), for example sinusoidal, square, trapezoidal, or any other shapes. Although that sinusoidal waveform is primarily used in existing synchronous motors, a waveform with significant harmonic content, such as a trapezoidal or square wave, can also be used in dynamically reconfigurable synchronous machines (motors or generators) (DRSM), as multi-harmonic FoC can be used to generate torque at multiple harmonic planes, significantly improving the torque density and power density of the motor. FIG. 6 shows an example of 6 poles with a trapezoidal magnetic field, where in the air gap under each pole the spatial distribution of the magnetic strength takes a half wave of a trapezoidal shape. As discussed previously, other waveforms can also be realized if desired. FIG. 6 can be considered a half-portion of the 12-pole configurations in FIG. 5. In FIG. 6, the horizontal axis represents a mechanical distance or angle of the air gap along its circumference, and the vertical axis is the magnetic field strength in the air gap. The polarity of the poles is also labeled accordingly, with a positive magnetic density relates to N magnets, and negative magnetic density in the air gap corresponds to S magnets. Because towards the edge of a pole, the magnetic field strength is significantly lower, this kind of trapezoidal waveform are easier to generate with a motor structure that has some saliency, i.e. the inductance along the d-axis and q-axis is quite different (such as a rotor with internal permanent magnets or salient poles). A square wave magnetic field are easier to generate with a motor structure that has no saliency, i.e. the inductance along the q-axis and d-axis is approximately equal (for example, rotor with surface mount magnets or round wound poles). Of course, the actual shape of the magnetic field may be in any other waveform, and can be designed to get desired performance for a targeted application. For example, a sinusoidal waveform, sometimes with some harmonic contents, may be used if desired by shaping the surfaces of pole shoes in the poles, especially the surface of a pole facing the air gap and the distance between neighboring pole shoes, to create a deliberately uneven air gap with the right shape and salience, as is known in the industry. If Poles 2 and 5 reverses polarity, then the magnetic field is shown in FIG. 7A. Now this structure become in effect 2 poles, still in a roughly trapezoidal waveform. The waveform can have a flat top with some fluctuation, or can be made in other shapes if desired. Since it may have non-negligible harmonic contents, multi-harmonic FoC control as shown in FIG. 2 can be used to control the motor. In both FIG. 6 and FIG. 7A, the positive and negative magnitudes are equal. When the low-pole configuration corresponds to FIG. 7A is used, sometimes, for example at high speed, it may be desired to reduce the high-order harmonic contents of the magnetic field generated by the rotor poles in the air gap. This can be done by adjusting the relative magnetic field strength under each pole so the magnetic field may have more levels to emulate a sinusoidal waveform, as is shown in FIG. 7B where B1>B2. FIG. 7A and FIG. 7B are also collectively referenced as FIG. 7 in this disclosure. Generally, as is shown in FIGS. 6 and 7, sometimes it is desired to maintain symmetry between positive half and negative half of the magnetic field, and also along the 45° and 135° lines which corresponding to the middle point of Poles 2 and 5, to control the harmonic contents. This illustrates the basic concept of dynamic reconfiguration in the field side of the motor, here the rotor. Again, other shapes of magnetic distribution can also be used if desired. Sometimes, it is also desired to create asymmetric magnetic waveforms, and that can be done easily by adjusting the relative strength of magnetic field of the poles.

Figure 8:
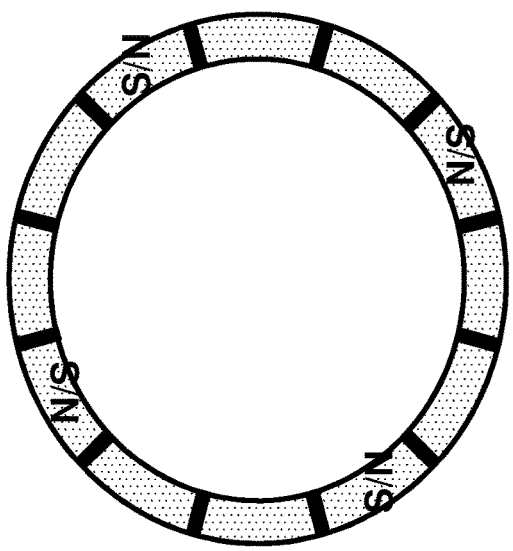
FIG. 8 shows an exemplary arrangement of a unchanged group and a reversible group of a 12-pole arrangement in accordance with various embodiments of the present disclosure.
Figure 8:
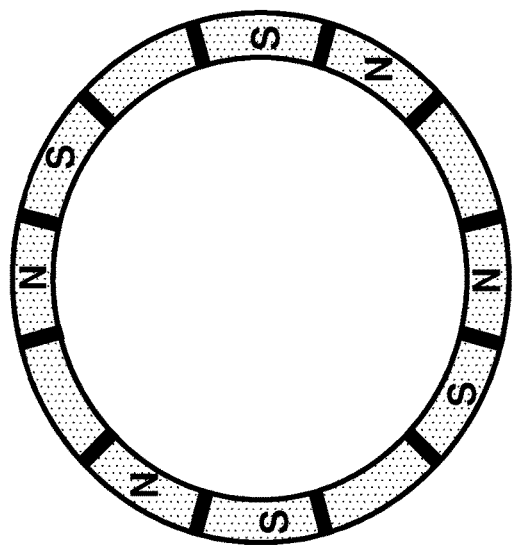

As is shown in FIGS. 5, 6 and 7, between different pole configurations, only part of the poles have a polarity change, and part of the poles keep the same polarity. Therefore, the poles in the motor may be divided in two or more groups, and each group of poles should have the same change pattern: the first group (unchanged group) contains the poles whose polarity doesn't need to change, and the second group (reversible or reversing group) contains those poles whose polarity needs to change during a pole-changing transition. If more than two pole configurations (i.e. more than two pole numbers or more than two configurations with different pole magnetic field strength levels are needed), more than one reversible groups (and similarly pore than one unchanged groups) may be used, so the poles whose polarity or magnetic field strength are changed in synchronization can be arranged as a group to simplify control implementation. In this way, the arrangement and control of different pole numbers or different magnetic field shapes may be treated as current control of the field windings in different pole groups. FIG. 8 shows an example. The Group A contains the poles whose polarity never changes which are called non-change poles or unchanged poles, and are labeled by its polarity (N or S), while Group B contains the poles whose polarity may needs to be reversed during operation, which are called reversible poles or reversing poles, and are labeled as S/N or N/S. Again, more groups may be used if more elaborate control of magnetic reconfiguration is desired.

Figure 9A:
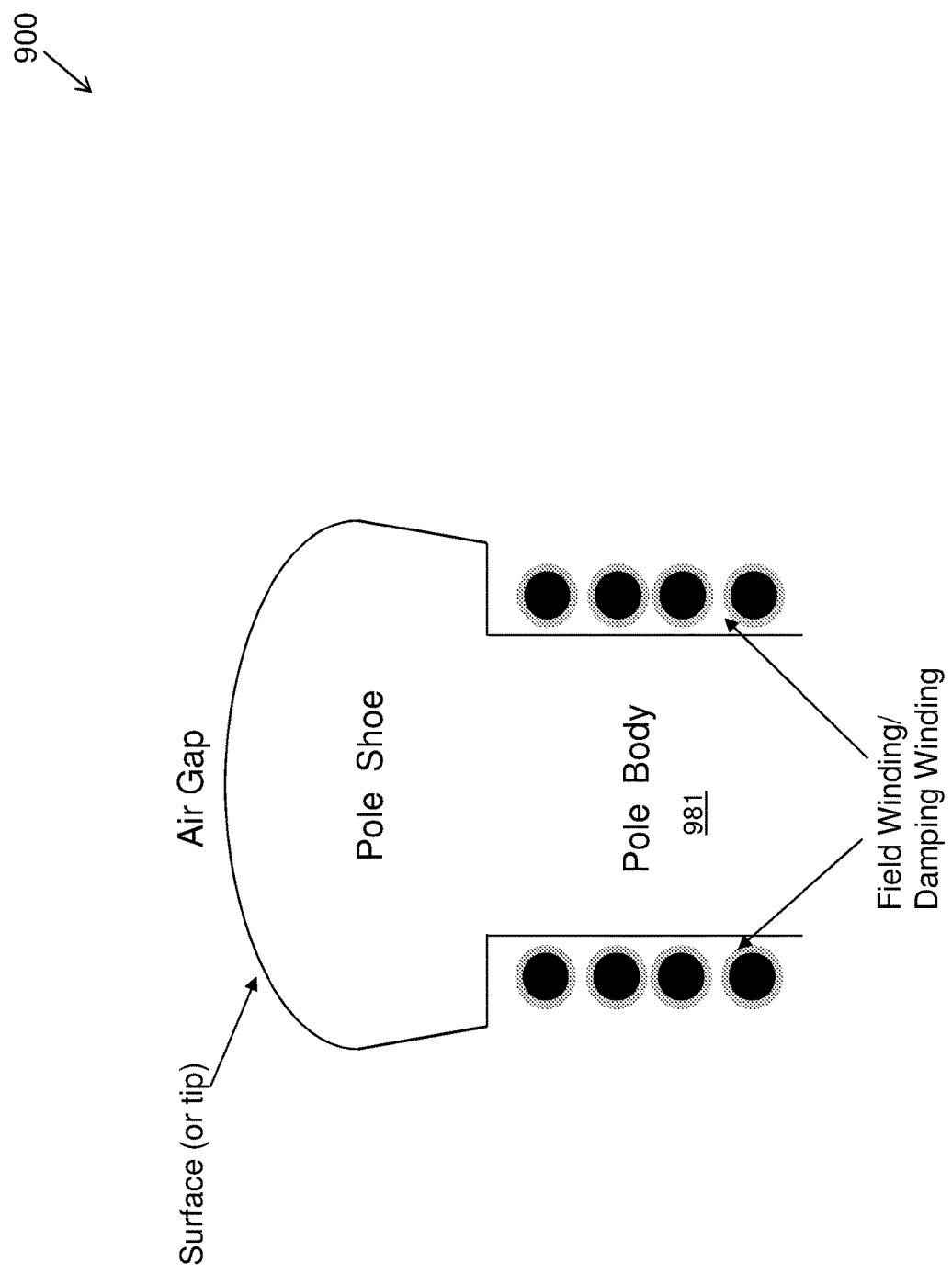
FIG. 9A illustrates a conceptual drawing of an excited pole or magnet in accordance with various embodiments of the present disclosure.

The magnetic field may be generated by permanent magnets, or poles embedded with field windings with suitable current flowing through them (excited poles), a combination of permanent magnets and excited poles (hybrid excitation). Permanent magnets and excited poles can be designed, shaped and placed to make desired performance, including the right magnetic field strength distribution and suitable saliency. With the upcoming memory-effect permanent magnets, reversible permanent magnet poles can be made with such magnets and control windings. However, at this time it is easier to make reversible poles with excited poles, as the reversing polarity of such poles can be easily implemented as a reverse of field current direction. FIG. 9A illustrates a conceptual drawing of an excited pole, with the round blackened circles illustrating the conductors of a field winding. The magnetic material of an excited pole including a pole shoe which conducts the magnetic field generated by the field winding into the air gap adjacent to the pole. A pole body, around which the field winding can be wound, supports the field winding while conducting its magnetic flux. A yoke area connects the flux generated by different poles. The magnetic field from the excited pole is determined mainly by the field winding and current in the field winding. A damping windings may be placed in the excited poles if desired, but it is optional. The magnetic field distribution in the air gap from the pole is mainly determined by the tip (outer surface) of the pole shoe, so the shape of the outer surface of the poles shoe should be designed to give a desired field distribution including salience. If the surface is round (i.e. part of a circle), then the air gap at the pole is even since most stator surface is round in shape, which tends to give a flat distribution such as in a square wave or trapezoidal wave magnetic field. However, if the surface of the pole show is shaped to create an uneven air gap across the span of the pole, the magnetic field strength in the nearby air gap may be controlled to follow certain curve, for example in a sinusoidal shape. In this way, through control of the field winding current and/or adjusting the shape of the pole shoe, the magnetic field distribution in the nearby air gap can be shaped to give a good performance of the motor for the desired operation.

Figure 9B:
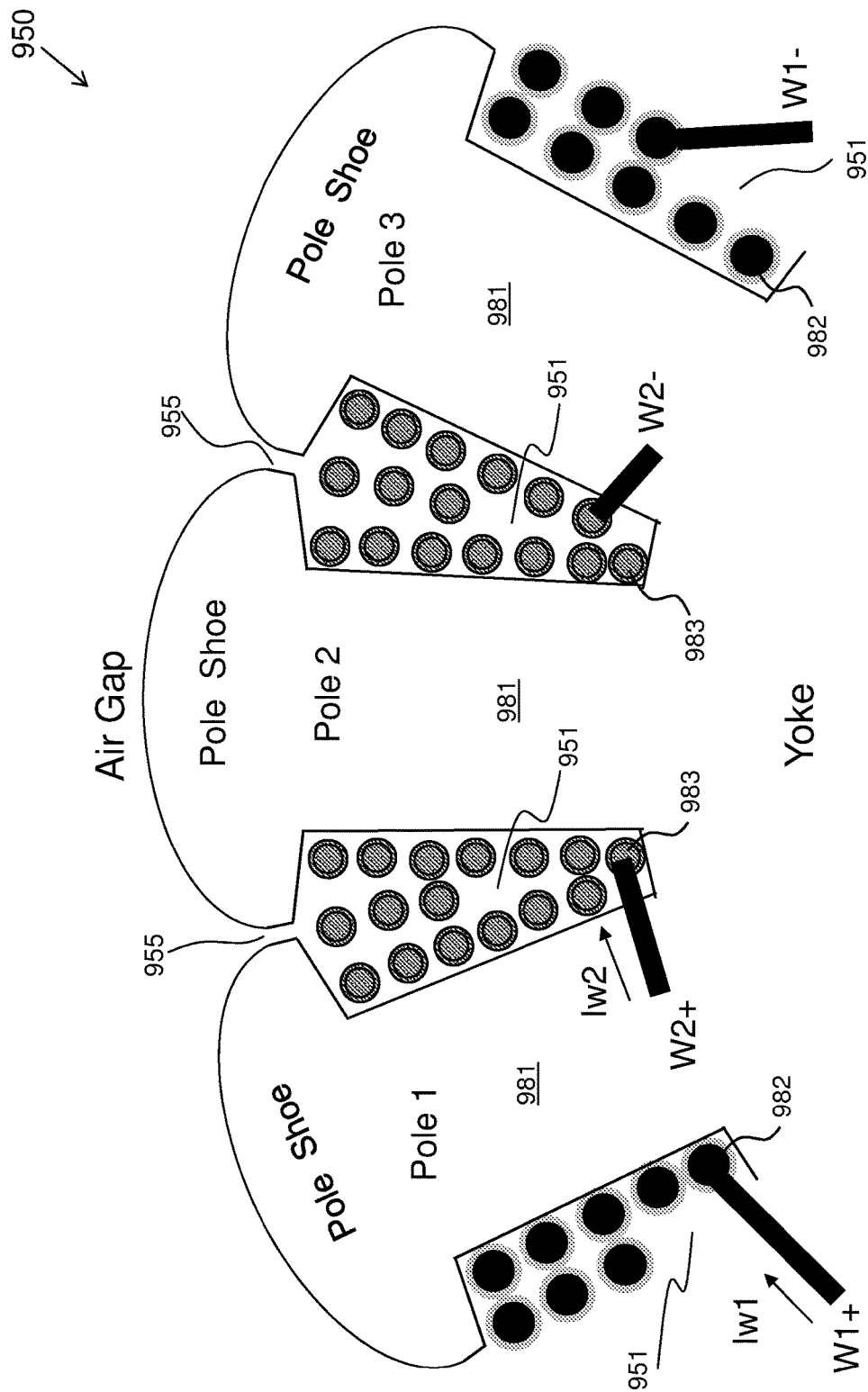
FIG. 9B illustrates a conceptual drawing of three excited poles with field windings in accordance with various embodiments of the present disclosure.
Figure 9C:
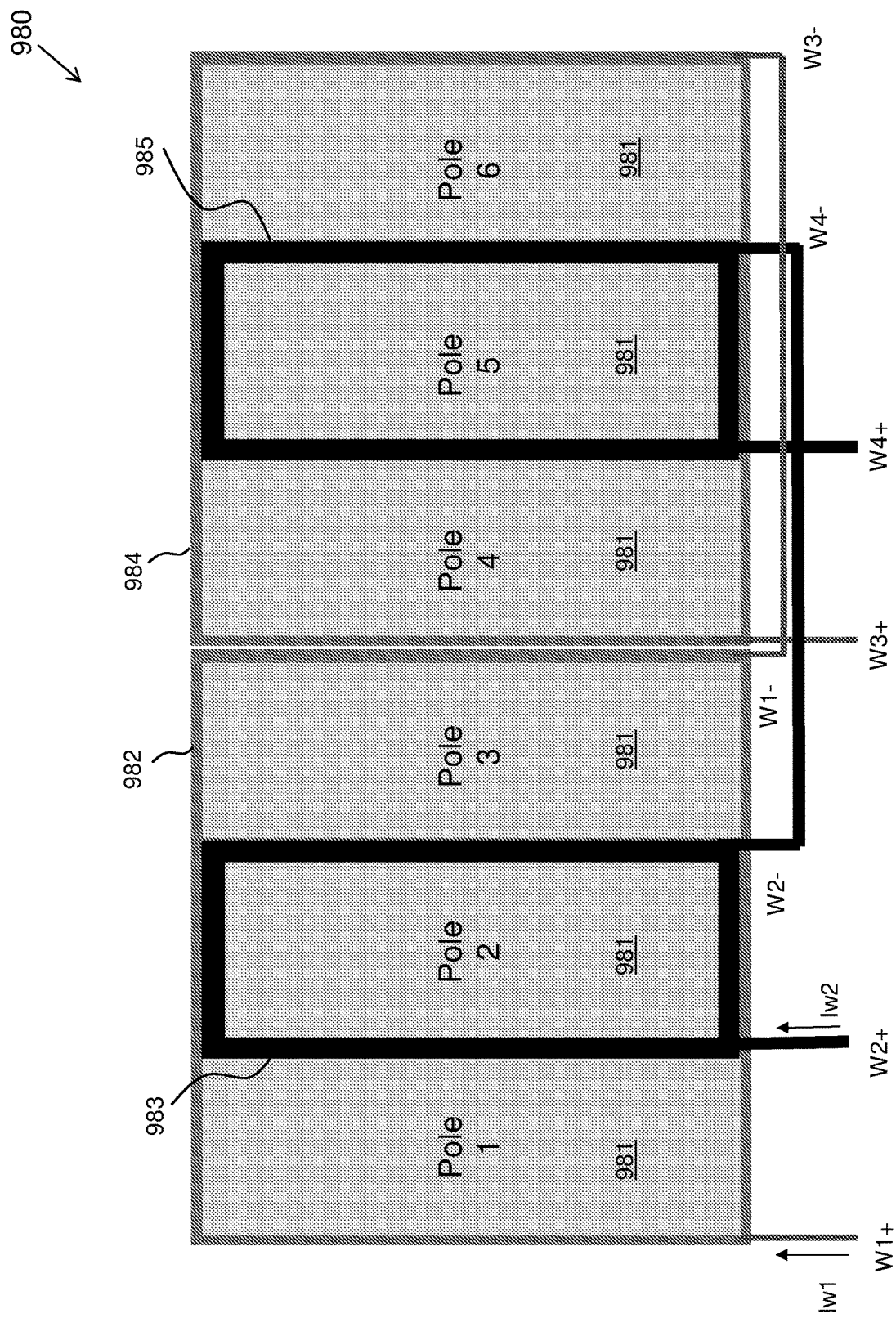
FIG. 9C illustrates a conceptual drawing of six excited poles with field windings in accordance with various embodiments of the present disclosure.

Although it is a conventional practice to wind a field winding around each pole body, it may be desired to wind field windings in multiple poles in a coordinated pattern to improve the performance of the motor. FIG. 9B shows an example, in which two windings for three poles (which may be considered as half of the poles in FIGS. 6 and 7). As is shown in the drawing, field windings are placed in window area 951 between body 981 of neighboring poles. The space 955 between the shoe tips of neighboring poles has no magnetic material, and is a magnetic barrier. Winding 2 labeled as 983 (whose conductor are shown as dotted circles) with start lead W2+ and end lead W2− is wound around Pole 2, and Winding 1 labeled as 982 (whose conductors are shown as blackened circles) with start lead W1+ and end lead W1− is wounded around and encloses poles 1, 2 and 3. In high-pole configuration (where the pole number is high), the current in winding 1 (Iw1) and the current in winding 2 (Iw2) should be arranged to result in same amp-turn but reverse polarity in winding 1 and winding 2 (i.e. Iw1 is positive, but Iw2 is negative, i.e. Iw1 and Iw2 have opposite directions). In low-pole configuration, the polarity of Pole 2 may be changed by reversing Iw2 (i.e. both Iw1 and Iw2 are positive or have the same direction)), and the amplitude of Iw1 and Iw2 may be determined to give the desired waveforms of magnetic field as exemplified by FIGS. 7A and 7B. A particular advantage of this arrangement is that in each window area the conductors only carry current in one direction, which results in lower power losses of windings for the same magnetic field strength compared to the arrangement of a field winding around each pole. FIG. 9C illustrates a prospect view of half the rotor shown in FIGS. 3 and 4 cut along a perimeter of the rotor to expose the field windings and pole bodies, with poles 4 through 6 added to the configuration of FIG. 9B. In FIG. 9C, each pole body 981 is illustrated in light grey, small windings 983 and 985 which just encircle one pole body are illustrated in black, and big windings 982 and 984 which encircle 3 pole bodies are illustrated in dark grey. The number of turns for each winding may be designed according to system needs, and may be different from each other. However, all windings which are to be connected in series or in parallel as a group should be designed to have the same current or voltage. Winding 3 (984) (starting lead W3+, end lead W3−) is wound around pole 5, and winding 4 (985) is wound around and encloses poles 4, 5 and 6. Winding 1 (982) and Winding 3 (984) are connected in reverse-series by connecting W1− and W3− so the currents in windings 982 and 984 have the same value but opposite direction, and Winding 2 (983) and Winding 4 (985) are connected in reverse-series by connecting W2− and W4− so the currents in windings 983 and 985 have the same value but opposite direction. Of course, windings 1 and 3 may be connected in reverse-parallel, as well as windings 2 and 4. Such connection pattern can be extended to other poles in the motor. Through series and parallel connection of multiple field windings in a motor, field windings with the same change pattern can be grouped together, so current control can be made easier. Please note that the magnetic material in poles 2 and 5 may have a smaller length to accommodate more conductors from field windings 982 and 983 or 984 and 985 at the ends of the rotor. As is well known in the industry, the magnetic material for the poles may be silicon steel, ferrite, iron powers or other magnetic-conducting materials formed through various suitable processes.

Figure 10A:
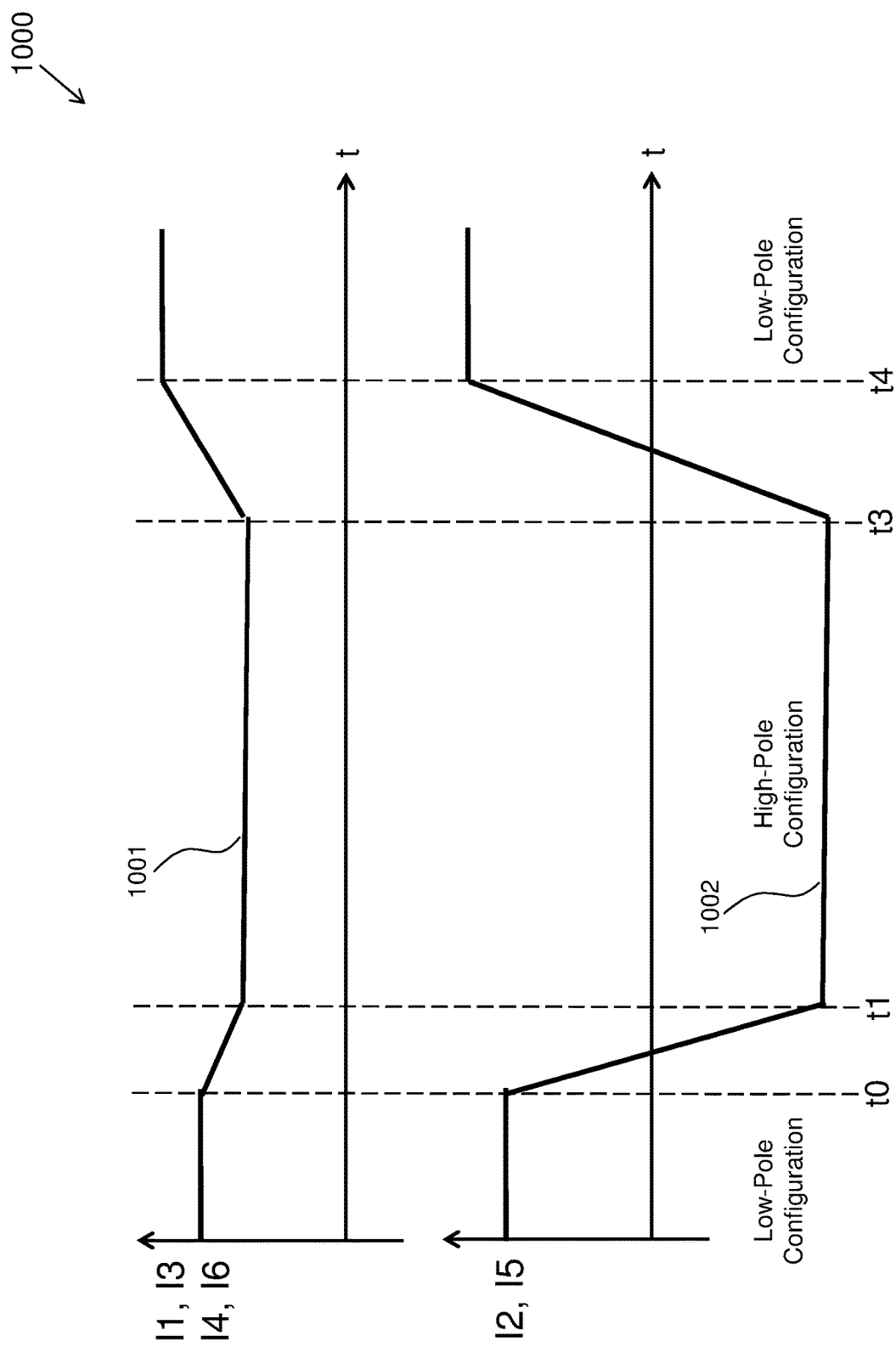
FIG. 10A illustrates a conceptual drawing of field currents with dynamic configuration in accordance with various embodiments of the present disclosure.
Figure 10B:
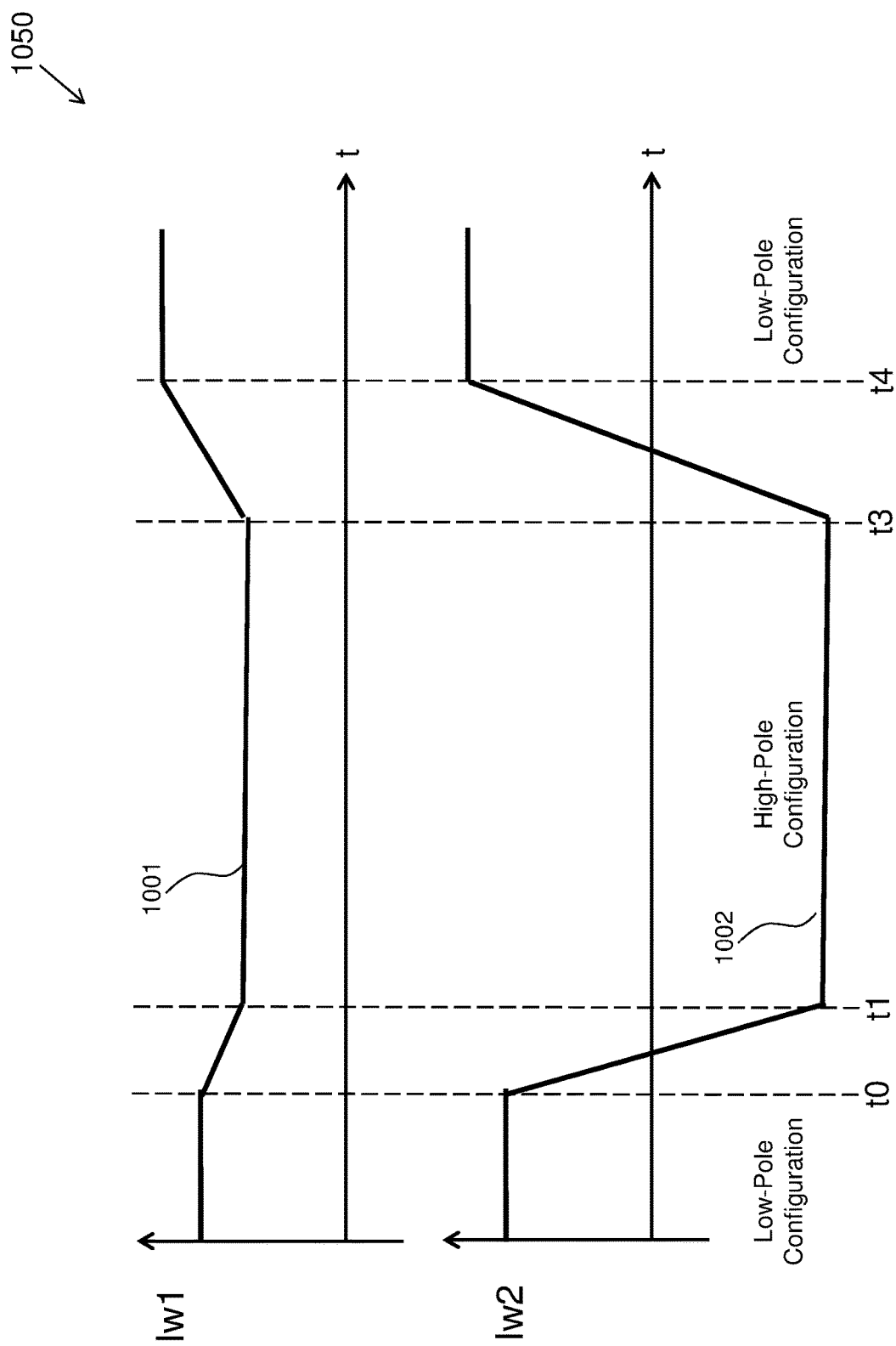
FIG. 10B illustrates another conceptual drawing of field currents with dynamic configuration in accordance with various embodiments of the present disclosure.

We will use a scenario where all poles are the excited type to illustrate a pole change process. In FIG. 10, the numbering of the current refers to the field winding in the numbered pole (i.e. I1 means the current in the field winding of pole 1). Prior to t0, the rotor and the motor are in a low-pole configuration. At t0, the system starts a pole-change transition, and the field currents start to change. The field winding currents in the non-changing poles (poles 1,3, 4, 6 and so on) don't change direction in the process, while the field winding currents in the reversing poles (poles 2 5, and so on) do change direction in the pole-change process. With proper control, the currents can change gradually to give a smooth transition. A linear transition is shown in the figure, but other shape of transition, for example a sinusoidal transition, is also possible. At t1, the motor gets to the end of transition and the system reaches the desired high-pole configuration. With a smooth transition of the field winding currents during the transition, there is significant magnetic field strength in both outgoing harmonic plane and incoming harmonic plane, so there are significant harmonic contents in the phase winding currents/voltages, and magnetic field of the motor during the transition. The stator currents can be controlled with multi-harmonic FoC principle to generate torque on both harmonic planes if needed, and the total torque generated by the motor controlled during the transition. The stator current can be controlled in synchronization such that the sum of torque generated on all active harmonic planes remains approximately the same or follow a desired pattern, and the output from the motor may be kept continuous or even constant during the pole-change transition, so that there is no significant disturbance causing by the pole change. At t3 the system starts another pole-change transition which is similar to the transition between t0 and t1, but the pole change direction is reversed. In FIG. 10A, the winding current I1, I3, I4 and I6 are shown to be equal, so does I2 and I5. These currents may have different values if desired. FIG. 10B shows a similar process but the field windings are connected in tow groups as winding W1 and winding W2 in a similar way as is shown in FIGS. 9B and 9C. Through proper grouping of the field windings, the number of currents to be controlled can be much lower than the number of poles, which can reduce the system cost. Although two groups are indicated in FIG. 10B, more groups are possible if desired.

This kind of pole change-operation can be applied to various motor topologies and configurations. Please note that the amplitude of the field currents in reversible poles affects the strength of harmonic field in the air gap during low-pole and high-pole configurations as is indicated in FIG. 7, and can be used as a means of $3^{rd}$ or other harmonic injection in steady-state operation to optimize performance of the system. For example, when the required torque is not very high, by increasing the magnetic field of the reversible poles to be higher than the non-changing poles, the $3^{rd}$ (and possibly other high order) in low-pole configuration harmonic components in the magnetic field can be reduced (and the shape of the pole shoe surface may be designed to reduce such harmonic contents when desired), so the power losses of the motor can be reduced, resulting in higher motor and system efficiency. In this way, the motor may work with more sinusoidal currents and air gap magnetic field in low to mid torque range, significantly increasing system efficiency in applications such as electrical vehicles. When required torque is high, the field winding currents can be adjusted so right amount of harmonic contents are created in the air gap magnetic field (and in the rotor and stator also), and together with stator windings' multi harmonic control magnetic saturation in various regions of the rotor and/or the stator is alleviated and more torque is generated in a plurality of harmonic planes, to significantly increase the torque and power capability of the motor.

Although dc currents in the field windings are assumed in steady-state operation in previous discussion, but it is feasible that ac currents with proper frequency, phase and amplitude are fed into the field windings to establish a rotating magnetic field, so the motor becomes a wound-rotor induction motor, or doubly-fed induction motor. Pole reconfiguration principles discussed previously can still be applied to such motors.

Figure 11:
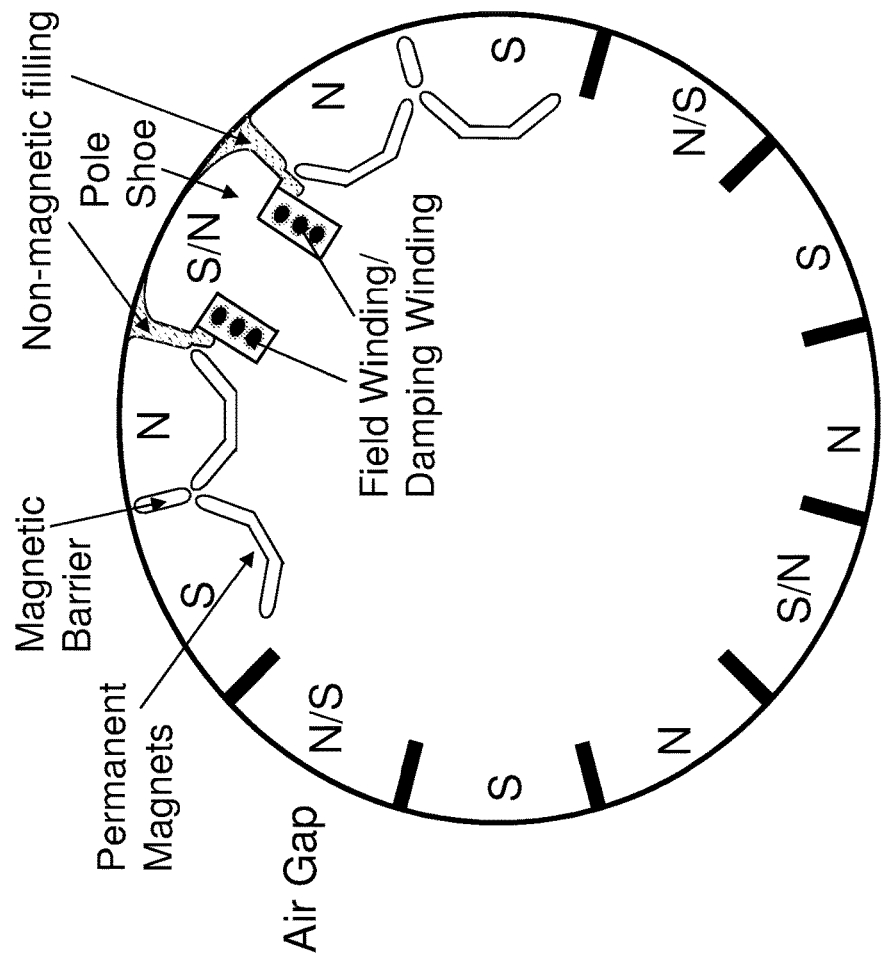
FIG. 11 illustrates a conceptual drawing of a hybrid excitation system with permanent magnet poles mixed with excited poles in accordance with various embodiments of the present disclosure.

It is also possible that the non-changing poles are implemented with permanent magnets in surface mount configuration or embedded (buried inside) configuration with various arrangements of permanent magnets, while the reversible poles use excited poles. FIG. 11 shows an example with V-grooved internal magnets and excited poles. The areas around the tips of the excited poles (shown as the shaded areas) may be filled with non-magnetic materials if desired, such as plastic compound, glues, or epoxy. Optionally, the same or different non-magnetic material may come into the compartments where the field windings and optional damping windings are located. The non-magnetic material may improve the mechanical strength and integrity of the poles and/or the windings, and may also be designed to conduct heat and provide cooling to the pole and/or the windings. The shape of pole shoe (especially the surface) of the reversible poles should be designed in coordination with the permanent-magnet poles so d-axis inductance and q-axis inductance of these poles have a similar value to facilitate a smooth torque and current control, which may be implemented under the principle of multi-harmonic FoC control depicted in FIG. 2. In this kind of hybrid excitation rotor, the amplitude of the field windings in the reversible poles can also be adjusted to control the amount of harmonic injection in the air gap magnetic field, in addition to pole changing as in previous discussions. In addition, intentionally reducing the amplitude of the field currents in the reversible poles may reduce also the fundamental component in the air gap flux, and thus has the effect of field weakening. This can be used advantageously in some design.

As the amplitude of field currents affects not only the rotor flux linkage, but also harmonic contents of the magnetic field in the air gap as demonstrated by FIGS. 7, in steady-state operation the currents of the field windings, especially of the reversible poles, can be controlled to increase or decrease the harmonic contents of magnetic field in the motor to generate a desired magnetic waveform, to improve torque and power of the motor, while optimizing performance index such as power losses or efficiency. As the magnetic field in the air gap is established primarily by the phase winding currents and field winding currents collectively, magnetizing currents and field currents should be determined in coordination according to better system performance, usually the system or motor efficiency. It should be note that using field winding currents to create a desired harmonic contents in the air gap flux generally is more efficient than creating such harmonic contents by currents of phase windings, and thus achieving higher motor efficiency. Therefore, whenever possible it is better to treat field currents as the primary means to generate harmonic flux, and adjusting the phase currents accordingly when needed. In addition, if the poles in the rotor may produce certain unwanted harmonic components in the air gap and stator, the phase currents may be controlled to have proper harmonic contents to eliminate or reduce such unwanted harmonic contents in the air gap and stator magnetic field. With multi-harmonic FoC control, harmonic contents in magnetic field can be utilized to generate more torque on respective harmonic planes.

Figure 12:
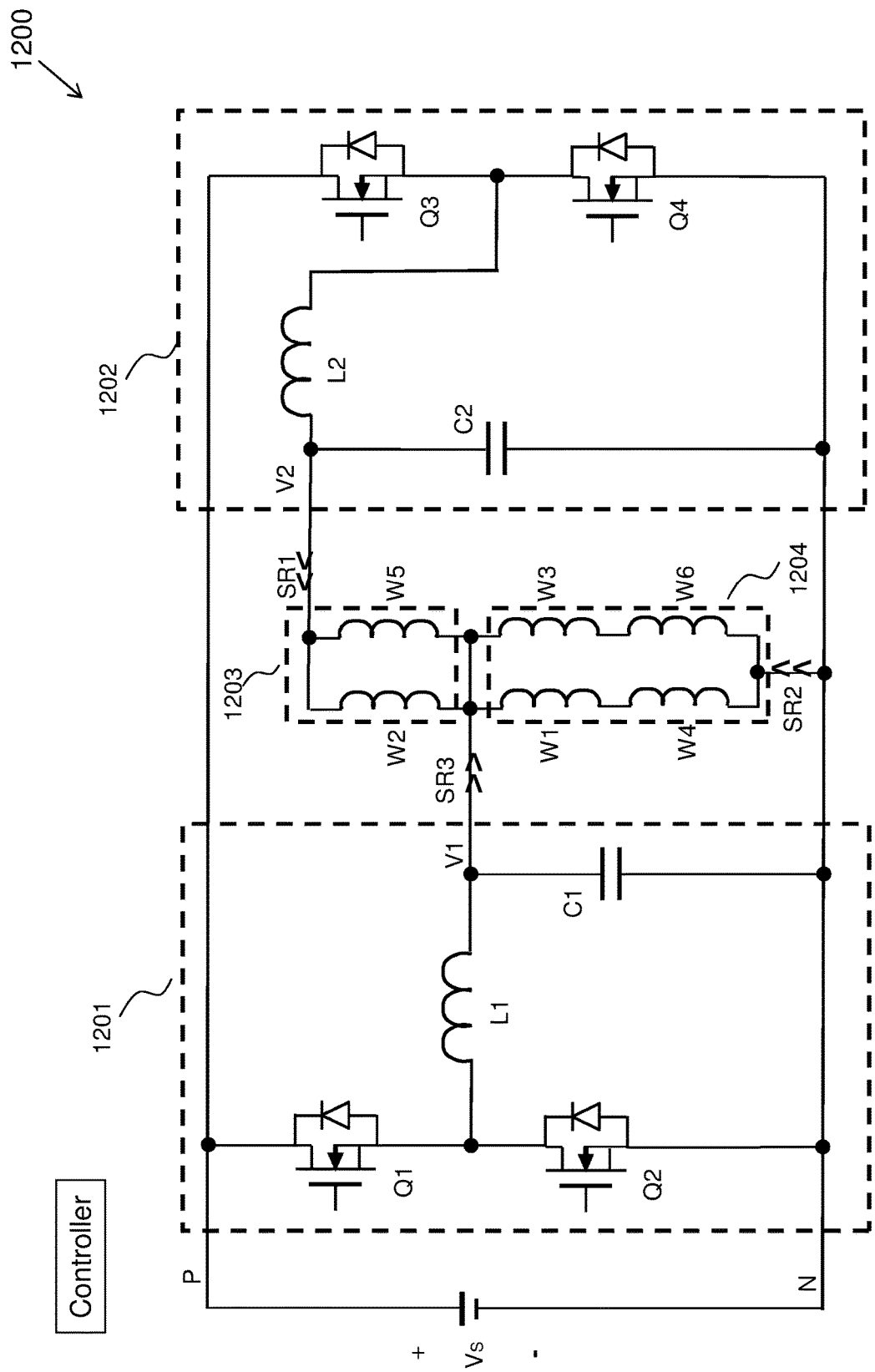
FIG. 12 shows a block diagram of an excitation control system in accordance with various embodiments of the present disclosure.

The control of dynamically reconfigurable synchronous motors can be implemented according to multi-harmonic FoC principle shown in FIG. 2 plus regulation of currents in field windings. If the field windings are located in the rotor, slip rings and/or wireless power transfer (WPT) can be used to bring excitation energy to the windings on the rotor. With the field windings with the same change pattern grouped together, the power delivery to the field windings can be much simplified. FIG. 12 shows an exemplary field current regulator to control the currents in field windings, in which W1 through W6 are the field windings for poles (or pole groups) 1 through 6, and SR1, SR2, and SR3 are 3 sling rings. The windings in the rotor can be arranged in series and in parallel to facilitate the reduction of power interconnections. In FIGS. 12, W2 and W5 are connected in parallel to form a reversible group 1203. W1 are connected in series with W4 to form a branch, W3 and W6 are connected in series to form another branch, and these two branches are connected in parallel to form a non-change group 1204. Power switches Q1 and Q2, together with an inductor L1 and a capacitor C1, form a buck converter 1201 with an output V1. Power switches Q3 and Q4, together with an inductor L2 and a capacitor C2, form another buck converter 1202 with an output V2. If needed, other power converter topologies may be used in power converters 1201 and/or 1202. A controller controls the power converters to generate the currents for the windings. Generally, windings in a non-changing group can be connected between an output of a power converter and a power rail (P or N), and windings for a reversible group can be connected between the outputs of two or more power converters, so the output voltages of power converters can be configured to provide the right voltages for different winding groups. The power converter may be located in the rotor or outside the rotor. In FIG. 12 the power converters are assumed to be located outside the rotor, so slip rings SR1 though SR3 are used to deliver power from the outputs of the power converters to the windings. Generally 3 or 4 slip rings are enough for a rotor with dynamic reconfiguration. Of course, the interconnection of windings may have different pattern to suit a particular design, and different ways to arrange the power converters are possible. For example, the power converters may be located inside the rotor. Also, a full-bridge converter can change the direction of a current while control the amplitude of the current if desired with PWM and other control mechanism. In case wireless power transfer is used to transfer excitation power to the rotor, it is desired to use a high frequency (for example in MHz range) to reduce the size and weight of the receiver while reducing power loss in metal materials of the motor in the presence of magnetic field from the WPT system.

The stator winding may be distributed windings or concentrated windings, depending on the system requirement. Concentrated windings are easier to manufacture, and have lower cost. With dynamically reconfigurable synchronous motors, the number of poles can be adjusted to give better performance of the system. For example, at very low speed, a high pole configuration can be used to increase the frequency of winding currents, which can make parameter identification and/or sensorless control easier. When the required torque is very high, a high pole configuration can be use with close to square wave currents and magnetic fields, so the size of the motor can be significant reduced compared to existing technology. At high speed operation, a low-pole configuration can be selected with more sinusoidal currents and magnetic field, and harmonic contents in winding currents and the magnetic field in the air gap may be reduced by controlling the field current amplitude in the reversible poles, as is illustrated in FIG. 7B, so high efficiency can be achieved. Please note that the change of the pole number of in the stator (which is the pole number of the magnetic field in the air gap generated by currents and magnets in the stator) should be in synchronization with the change of pole number in the rotor (which is the pole number of the magnetic field in the air gap generated by currents and magnets in the rotor), and preferably the pole change transition in the stator and in the rotor should be coordinated and in synchronization so that the output torque during the transition follows a desired pattern to avoid significant disturbance to users of the system. As discussed previously, multi-harmonic FoC control with suitable field current control can be used to implement the dynamic reconfiguration technology, which can be used advantageously to improve system efficiency while reduce system size, weight and cost. As the multi-harmonic FoC control coordinates torque generation at different frequencies, it can also be used to reduce the ripple of mechanical torque and thus improve the noise and vibration performance of a motor and motor drive systems.

The discussion above is based on synchronous motors with wound field windings. This is merely an example. The technology discussed above can also be applied to other types of motors and generators. For example, in a brushless dc motor, the dynamic reconfiguration may be used to generate torque at a plurality of selected harmonics to output a high torque in some operation modes, and reduce one or more unwanted high-order flux in some operation modes to reduce the power loss and mechanical vibration, thereby improving efficiency and/or torque ripples in some operation modes, while increasing the power/torque density when needed. The desired harmonic injection in the multi-harmonic control may be dependent on characteristics, size, shape and location of the permanent magnets, and can be obtained from various methods such as analysis, simulation, calculation, testing, any combinations thereof and the like.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A device comprising:
a rotor magnetically coupled to a stator through an air gap;
a plurality of phase windings configured to be coupled to a plurality of inverters and generate a first magnetic field, wherein a pole number of the first magnetic field is configured to be dynamically adjustable through controlling currents in the plurality of phase windings by configuring the plurality of inverters, wherein the plurality of phase windings is located on at least one of the stator and the rotor; and
a plurality of poles comprising a group of unchanged poles and a group of reversible poles and configured to generate a second magnetic field in the air gap, wherein:
polarities of the unchanged poles are fixed in operation, and
a polarity of each reversible pole is configured to be changed during an operation mode, and after a polarity of one reversible pole has been changed, the one reversible pole and two respective adjacent unchanged poles of a same polarity are in effect merged into one augmented pole, and wherein as a result of having the one augmented pole, a pole number of the second magnetic field is changed.

2. The device of claim 1, wherein:
each reversible pole comprises a pole shoe, a pole body and a field winding around the pole body, and wherein a polarity of the reversible pole is configured to change when a direction of a current in the field winding is reversed.

3. The device of claim 2, wherein:
all field windings for the group of reversible poles are coupled to a plurality of power leads such that polarities of the reversible poles are changed at the same time.

4. The device of claim 2, wherein:
field windings of the reversible poles are configured such that an amplitude of currents in the field windings is configured to be adjusted to adjust harmonic contents of the second magnetic field.

5. The device of claim 2, further comprising:
a first field winding surrounding at least an unchanged pole and a reversible pole, and wherein a direction of a current in the first field winding is configured to remain unchanged during a polarity change of the reversible pole.

6. The device of claim 2, wherein:
the field winding is configured such that the current of the field winding is configured to change in a controllable fashion in synchronization with an adjustment of currents in the phase windings during a pole change transition such that a mechanical torque generated by the rotor follows a predetermined pattern.

7. The device of claim 2, wherein:
surfaces of pole shoes are shaped to form a predetermined magnetic field waveform in the air gap during operation.

8. The device of claim 1, wherein:
the group of reversible poles are located in the rotor.

9. The device of claim 1, wherein:
the group of reversible poles are located in the stator.

10. The device of claim 1, wherein:
one pole of the group of unchanged poles is implemented with permanent magnets.

11. A system comprising:
a motor having a plurality of phase windings, a rotor, an air gap, and a stator magnetically coupled to the rotor through the air gap, wherein;

the plurality of phase windings is configured to generate a first magnetic field in the air gap, and wherein a pole number of the first magnetic field is configured to be dynamically adjustable through controlling currents in the plurality of phase windings, and wherein the plurality of phase windings is located on at least one of the stator and the rotor; and a plurality of poles facing the air gap is configured to generate a second magnetic field in the air gap, comprising:
- a group of unchanged poles, wherein each unchanged pole has a fixed polarity; and
- a group of reversible poles, each having a field winding around a pole body, wherein a polarity of each reversible pole is configured to be changed during an operation mode, and after a polarity of one reversible pole has been changed has been changed, the one reversible pole and two respective adjacent unchanged poles of a same polarity are in effect merged into one augmented pole, and wherein as a result of having the one augmented pole, a pole number of the second magnetic field is changed;

a plurality of power inverters coupled to the plurality of phase windings, wherein the plurality of power inverters is configured to control currents of the plurality of phase windings such that the pole number of the first magnetic field is dynamically adjusted during the operation mode; and a field current regulator coupled to the group of reversible poles and configured to change directions of currents in field windings in the operation mode such that polarities of the group of reversible poles are changed in synchronization with a pole number adjustment of the first magnetic field.

12. The system of claim 11, wherein:
the plurality of power inverters comprises multi harmonic current regulators in d-q frames; and
a multi-harmonic field-oriented control mechanism is configured to control torque generation in multiple harmonic planes.

13. The system of claim 12, wherein:
the field current regulator comprises a plurality of power converters configured to change currents in the field windings controllably in synchronization with a pole number adjustment in the multi-harmonic field-oriented control mechanism during a pole-change transition such that an output torque of the motor is constant or follows a predetermined pattern during the pole-change transition.

14. The system of claim 12, wherein:
the field current regulator comprises a plurality of power converters configured to change an amplitude of a current in a field winding to add a level to a second magnetic field waveform in the air gap and adjust a harmonic content of the second magnetic field.

15. The system of claim 11, wherein:
at least one pole of the group of unchanged poles comprises permanent magnets.

16. The system of claim 15, wherein:
the field winding is configured such that a current of the field winding is reduced in amplitude during an operation mode, thereby reducing a fundamental component of the second magnetic field in the air gap to facilitate field-weakening operation.

17. An apparatus comprising:
a rotor magnetically coupled to a stator through an air gap; and
a plurality of poles facing an air gap and configured to generate a first magnetic field in the air gap, wherein the plurality of poles includes a group of unchanged poles and a group of reversible poles, and wherein a polarity of each reversible pole is configured to be changed during an operation mode, and after the polarity has been changed, each reversible pole and two respective adjacent unchanged poles of a same polarity are in effect merged into one augmented pole, and wherein as a result of having the one augmented pole, a pole number of the first magnetic field is changed.

18. The apparatus of claim 17, further comprising:
a field winding wound around a body of each reversible pole, and wherein field windings of the group of reversible poles are coupled to a plurality of power leads such that polarities of all in the group of reversible poles are changed at the same time.

19. The apparatus of claim 18, wherein:
the plurality of power leads is coupled to a plurality of power converters, and the plurality of power converters is configured to change a current direction in each of the field windings during the operation mode.

20. The apparatus of claim 17, wherein:
the plurality of poles is configured to be magnetically coupled to a plurality of phase windings, and wherein the phase windings are configured to conduct currents to generate a second magnetic field in the air gap, and wherein a pole number of the second magnetic field is configured to change in synchronization with the pole number change of the first magnetic field.

* * * * *